(12) United States Patent
Zheng

(10) Patent No.: US 12,236,022 B2
(45) Date of Patent: Feb. 25, 2025

(54) STYLUS PEN INPUT METHOD, ELECTRONIC DEVICE, AND SYSTEM

(71) Applicant: Huawei Technologies Co., Ltd., Shenzhen (CN)

(72) Inventor: Tao Zheng, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/564,873

(22) PCT Filed: Mar. 30, 2022

(86) PCT No.: PCT/CN2022/084120
§ 371 (c)(1),
(2) Date: Nov. 28, 2023

(87) PCT Pub. No.: WO2022/247456
PCT Pub. Date: Dec. 1, 2022

(65) Prior Publication Data
US 2024/0264682 A1    Aug. 8, 2024

(30) Foreign Application Priority Data
May 28, 2021 (CN) .......................... 202110592512.1

(51) Int. Cl.
*G06F 3/0488* (2022.01)
*G06F 3/0354* (2013.01)
*G06F 3/04883* (2022.01)

(52) U.S. Cl.
CPC ...... *G06F 3/03545* (2013.01); *G06F 3/04883* (2013.01)

(58) Field of Classification Search
None
See application file for complete search history.

(56) References Cited

U.S. PATENT DOCUMENTS

| 2011/0320520 A1 | 12/2011 | Jain |
| 2013/0027404 A1* | 1/2013 | Sarnoff ............... G06F 3/04883 345/522 |
| 2015/0220797 A1 | 8/2015 | Saito et al. |
| 2016/0093087 A1 | 3/2016 | Tu et al. |
| 2016/0321238 A1 | 11/2016 | Kurita et al. |

(Continued)

FOREIGN PATENT DOCUMENTS

| CN | 103984512 A | 8/2014 |
| CN | 107168674 A | 9/2017 |

(Continued)

*Primary Examiner* — Carl Adams
(74) *Attorney, Agent, or Firm* — Conley Rose, P.C.

(57) ABSTRACT

A first electronic device receives a projection interface of a first application from a second electronic device, and displays the projection interface. The first electronic device receives a first input and a second input that are in the projection interface and that are of a stylus pen used by a user, and displays an updated projection interface. The updated projection interface includes a first layer and a second layer. The first layer includes a first image that includes a first handwriting trajectory and that is generated by the second electronic device based on the first input; and the second layer includes a second handwriting trajectory that is locally drawn by the first electronic device based on the second input.

20 Claims, 12 Drawing Sheets

(56) References Cited

U.S. PATENT DOCUMENTS

2017/0123648 A1* 5/2017 Mozumder ............. G06T 11/00
2021/0160302 A1 5/2021 Vu et al.

FOREIGN PATENT DOCUMENTS

| CN | 103984512 B | 1/2018 |
|----|-------------|--------|
| CN | 108459836 A | 8/2018 |
| CN | 111338593 A | 6/2020 |
| CN | 111475097 A | 7/2020 |
| JP | 2023503641 A | 1/2023 |

* cited by examiner

STYLUS PEN INPUT METHOD, ELECTRONIC DEVICE, AND SYSTEM

CROSS-REFERENCE TO RELATED APPLICATIONS

This is a U.S. National Stage of International Patent Application No. PCT/CN2022/084120 filed on Mar. 30, 2022, which claims priority to Chinese Patent application No. 202110592512.1 filed on May 28, 2021. Both of the aforementioned applications are hereby incorporated by reference in their entireties.

This application claims priority to Chinese Patent Application No. 202110592512.1, filed with the China National Intellectual Property Administration on May 28, 2021 and entitled "STYLUS PEN INPUT METHOD, ELECTRONIC DEVICE, AND SYSTEM", which is incorporated herein by reference in its entirety.

TECHNICAL FIELD

This application relates to the field of terminal technologies, and in particular, to a stylus pen input method, an electronic device, and a system.

BACKGROUND

A stylus pen (stylus pen), also referred to as a stylus, is a pen-shaped tool used to input instructions to an electronic device that has a touchscreen, like a computer screen, a mobile device, and a drawing board. A user may use a stylus pen to tap a touchscreen of an electronic device to select a file, write, draw, or the like, so that user's interaction experience in writing, drawing, or the like on the electronic device is better.

Writing immediateness is a key indicator that affects user experience of using the stylus pen, and is usually represented by a latency (a line-drawing latency) from a moment when the stylus pen performs input on the touchscreen to a moment when a handwriting trajectory is displayed on the touchscreen. There are a plurality of factors that affect the line-drawing latency. How to reduce the line-drawing latency and improve the writing immediateness of a stylus pen is a problem that needs to be resolved.

SUMMARY

This application provides a stylus pen input method, an electronic device, and a system, so as to reduce a line-drawing latency and improve writing immediateness of a stylus pen.

To achieve the foregoing objectives, the following technical solutions are used in this application.

According to a first aspect, a stylus pen input method is provided. The method includes: A first electronic device receives a projection interface of a first application. The first application runs on a second electronic device. The first electronic device receives an input of a stylus pen of a user in the projection interface, and displays an updated projection interface. The input of the stylus pen includes a first input and a second input. The updated projection interface includes a first layer and a second layer, the first layer includes a first image that includes a first handwriting trajectory and that is generated by the second electronic device based on the first input, and the second layer includes a second handwriting trajectory that is drawn by the first electronic device based on the second input.

In the method, the second handwriting trajectory that is locally drawn by the first electronic device is displayed on a projection image in a superimposed manner that includes the first handwriting trajectory and that is generated by the second electronic device. Because a latency of the second handwriting trajectory that is locally drawn is less than a latency for obtaining the projection image that includes the first handwriting trajectory, a distance between the first handwriting trajectory and the stylus pen can be reduced, a line-drawing latency can be reduced, and writing immediateness of the stylus pen can be improved.

According to the first aspect, the second layer is superimposed on the first layer.

According to the first aspect or any implementation of the first aspect, the method further includes: The first electronic device obtains a second image. The second image includes a third handwriting trajectory that is generated by the second electronic device based on the second input: the first electronic device displays the second image on the first layer. The third handwriting trajectory on the first layer covers the second handwriting trajectory on the second layer.

That is, a handwriting trajectory that is locally drawn by the first electronic device is covered, after specific duration, by a handwriting trajectory that is drawn by the second electronic device based on a same input. In an implementation, after the second handwriting trajectory is displayed for preset duration, display of the second handwriting trajectory stops. In another implementation, after the third handwriting trajectory covers the second handwriting trajectory, display of second handwriting trajectory stops.

In an implementation, the second handwriting trajectory is a continuation trajectory of the first handwriting trajectory. In another implementation, the second handwriting trajectory coincides with a part of the first handwriting trajectory and includes a continuation part of the first handwriting trajectory.

According to the first aspect or any implementation of the first aspect, an input time period of the first input and an input time period of the second input do not overlap at all or partially overlap. In an implementation, a length of the input time period of the second input is based on a first latency and/or a second latency. The first latency includes a latency for the first electronic device to obtain an image from the second electronic device, and the second latency includes a latency for the first electronic device to generate the second handwriting trajectory. For example, the input time period of the second input=(the first latency–the second latency), that is, the input time period of the first input and the input time period of the second input do not overlap at all. In this case, the second handwriting trajectory is the continuation trajectory of the first handwriting trajectory: For another example, the input time period of the second input=the first latency, that is, the input time period of the first input and the input time period of the second input partially overlap. In this case, the second handwriting trajectory coincides with the part of the first handwriting trajectory and includes the continuation part of the first handwriting trajectory.

According to the first aspect or any implementation of the first aspect, the method further includes: The first electronic device obtains a drawing parameter sent by the second electronic device, and the first electronic device draws the second handwriting trajectory by using the drawing parameter. The drawing parameter includes at least one of a line color parameter, a line thickness parameter, and a line texture parameter. For example, the drawing parameter includes a drawing parameter used by the second electronic device to draw the first handwriting trajectory. Because the drawing parameter used by the first electronic device to draw the second handwriting trajectory is the same as the drawing parameter used by the second electronic device to draw the first handwriting trajectory, the second handwriting trajectory and the first image that includes the first handwriting trajectory can be well fused. This brings better visual effect.

According to the first aspect or any implementation of the first aspect, when performing local drawing, the first electronic device predicts, based on a drawn handwriting trajectory, a segment of a handwriting trajectory by using a stroke estimate algorithm, combines a handwriting trajectory that is actually drawn based on handwriting information with a predicted handwriting trajectory. The predicted handwriting trajectory is displayed in advance, to form visual effect that a line-drawing display speed is fast. In this way, a latency for the first electronic device to draw a handwriting trajectory can be reduced.

According to a second aspect, a stylus pen input method is provided. The method includes: A first electronic device displays a projection interface of a first application, and receives a first input of a stylus pen. The first application runs on a second electronic device. The first electronic device sends information about the first input to the second electronic device; and receives a first image from the second electronic device. The first image includes a first handwriting trajectory that is drawn based on the information about the first input. The first electronic device displays the first image. The first electronic device receives a second input of the stylus pen, draws a second handwriting trajectory based on information about the second input, and displays the second handwriting trajectory. The second handwriting trajectory is displayed as a continuation trajectory of the first handwriting trajectory.

In the method, the first electronic device generates, by using a computing capability of the second electronic device, a projection image that includes the first handwriting trajectory, locally draws the second handwriting trajectory, and superimposes a handwriting trajectory that is locally drawn on the projection image that is generated by the second electronic device. Because a local drawing latency of the first electronic device is small, the handwriting trajectory that is locally drawn reduces a distance between the stylus pen on a screen of the first electronic device and a handwriting trajectory on the projection image, and reduces a line-drawing latency of an input of the stylus pen on the first electronic device, so that writing immediateness of the stylus pen is improved.

The whole second handwriting trajectory is the continuation trajectory of the first handwriting trajectory, or the second handwriting trajectory coincides with a part of the first handwriting trajectory and includes a continuation part of the first handwriting trajectory.

In an implementation, the first image is displayed on a first layer, the second handwriting trajectory is displayed on a second layer, and the second layer is superimposed on the first layer.

According to the second aspect, the method further includes. The first electronic device sends information about the second input to the second electronic device. The first electronic device receives a second image from the second electronic device. The second image includes a third handwriting trajectory that is drawn based on the information about the second input. The first electronic device displays the second image. The third handwriting trajectory in the second image covers the second handwriting trajectory.

That is, a handwriting trajectory that is locally drawn by the first electronic device is covered, after specific duration, by a handwriting trajectory that is drawn by the second electronic device based on a same input. In an implementation, after the second handwriting trajectory is displayed for preset duration, display of the second handwriting trajectory stops. In another implementation, after the third handwriting trajectory covers the second handwriting trajectory, display of second handwriting trajectory stops.

According to the second aspect or any implementation of the second aspect, a length of an input time period of the second input is based on a first latency and/or a second latency. The first latency includes a latency for the first electronic device to obtain an image from the second electronic device, and the second latency includes a latency for the first electronic device to generate the second handwriting trajectory. For example, the input time period of the second input=(the first latency−the second latency). In this case, the second handwriting trajectory is the continuation trajectory of the first handwriting trajectory. For another example, the input time period of the second input=the first latency. In this case, the second handwriting trajectory coincides with the part of the first handwriting trajectory and includes the continuation part of the first handwriting trajectory.

According to the second aspect or any implementation of the second aspect, the method further includes: The first electronic device receives a drawing parameter of the second electronic device. The first electronic device draws the second handwriting trajectory by using the drawing parameter based on the information about the second input. The drawing parameter includes at least one of a line color parameter, a line thickness parameter, and a line texture parameter. Because the drawing parameter used by the first electronic device to draw the second handwriting trajectory is the same as the drawing parameter used by the second electronic device to draw the first handwriting trajectory, the second handwriting trajectory and the first image that includes the first handwriting trajectory can be well fused. This brings better visual effect.

According to the second aspect or any implementation of the second aspect, when performing local drawing, the first electronic device predicts, based on a drawn handwriting trajectory, a segment of a handwriting trajectory by using a stroke estimate algorithm, combines a handwriting trajectory that is actually drawn based on handwriting information with a predicted handwriting trajectory: The predicted handwriting trajectory is displayed in advance, to form visual effect that a line-drawing display speed is fast. In this way, a latency for the first electronic device to draw a handwriting trajectory can be reduced.

According to a third aspect, a stylus pen input method is provided. The method includes: A first electronic device displays a projection interface of a first application. The first application runs on a second electronic device. The first electronic device receives a first input of a stylus pen, and sends information about the first input to the second electronic device. The second electronic device receives the information about the first input, draws a first handwriting trajectory based on the information about the first input, and generates a first image that includes the first handwriting trajectory. The second electronic device sends the first image to the first electronic device. The first electronic device receives the first image. The first electronic device displays the first image. The first electronic device receives a second input of the stylus pen, and draws a second handwriting trajectory based on information about the second input. The first electronic device displays the second handwriting trajectory. The second handwriting trajectory is displayed as a continuation trajectory of the first handwriting trajectory.

In the method, the first electronic device generates, by using a computing capability of the second electronic device, a projection image that includes a handwriting trajectory, locally draws a handwriting trajectory, and superimposes a handwriting trajectory that is locally drawn on the projection image that is generated by the second electronic device. Because a local drawing latency of the first electronic device is small, the handwriting trajectory that is locally drawn reduces a distance between the stylus pen on a screen of the first electronic device and a handwriting trajectory on the projection image, and reduces a line-drawing latency of an input of the stylus pen on the first electronic device, so that writing immediateness of the stylus pen is improved.

The whole second handwriting trajectory is the continuation trajectory of the first handwriting trajectory, or the second handwriting trajectory coincides with a part of the first handwriting trajectory and includes a continuation part of the first handwriting trajectory.

According to the third aspect, the method further includes: The first electronic device sends the information about the second input to the second electronic device. The second electronic device receives the information of the second input, draws a third handwriting trajectory based on the information about the second input, and generates a second image that includes the third handwriting trajectory: The second electronic device sends the second image to the first electronic device. The first electronic device receives the second image. The first electronic device displays the second image, the third handwriting trajectory covers the second handwriting trajectory.

That is, a handwriting trajectory that is locally drawn by the first electronic device is covered, after specific duration, by a handwriting trajectory that is drawn by the second electronic device based on a same input. In an implementation, after the second handwriting trajectory is displayed for preset duration, display of the second handwriting trajectory stops. In another implementation, after the third handwriting trajectory covers the second handwriting trajectory, display of second handwriting trajectory stops.

According to the third aspect or any implementation of the third aspect, the method further includes: The second electronic device sends, to the first electronic device, a drawing parameter for drawing the first handwriting trajectory. The first electronic device receives the drawing parameter, and draws the second handwriting trajectory by using the drawing parameter based on the information about the second input. The drawing parameter includes at least one of a line color parameter, a line thickness parameter, and a line texture parameter. Because the drawing parameter used by the first electronic device to draw the second handwriting trajectory is the same as the drawing parameter used by the second electronic device to draw the first handwriting trajectory, the second handwriting trajectory and the first image that includes the first handwriting trajectory can be well fused. This brings better visual effect.

According to the third aspect or any implementation of the third aspect, the method further includes: The second electronic device determines to send a changed drawing parameter to the first electronic device if any drawing parameter changes. The first electronic device draws the second handwriting trajectory by using the changed drawing parameter based on the information about the second input. In this implementation, when the drawing parameter changes, the second electronic device sends the drawing parameter to the first electronic device. Because the drawing parameter used by the first electronic device to draw the second handwriting trajectory is the same as the drawing parameter used by the second electronic device to draw the first handwriting trajectory, the second handwriting trajectory and the first image that includes the first handwriting trajectory can be well fused. This brings better visual effect.

According to a fourth aspect, a stylus pen input method is provided. The method includes: A first electronic device displays a projection interface of a first application. The first application runs on a second electronic device. The first electronic device receives a first input of a stylus pen of a user in the projection interface at a moment t0. The first electronic device displays a first handwriting trajectory corresponding to the first input in the projection interface at a moment t1. The first electronic device refreshes the projection interface at a moment t2. A refreshed projection interface includes a second handwriting trajectory corresponding to the first input, and the moment t1 is earlier than the moment t2.

In the method, the first electronic device and the second electronic device each draw a handwriting trajectory based on the first input. A latency of the handwriting trajectory that is locally drawn by the first electronic device is less than a latency for obtaining a projection image from the second electronic device, and the moment t1 is earlier than the moment t2. Displaying of a handwriting trajectory that is locally drawn by the first electronic device on a screen of the first electronic device is faster than displaying of a handwriting trajectory that is drawn by the second electronic device, so that a handwriting trajectory input by the stylus pen can be displayed to the user more quickly. This shortens a line-drawing latency of the stylus pen, and improves writing immediateness of the stylus pen is improved.

Because both the first handwriting trajectory and the second handwriting trajectory are drawn based on information about the first input, the first bandwriting trajectory and the second handwriting trajectory are identical line trajectories.

The first handwriting trajectory that is locally drawn by the first electronic device and the second handwriting trajectory that is drawn by the second electronic device are the identical line trajectories, and the second handwriting trajectory covers the first handwriting trajectory. From the moment t2, displaying of the first handwriting trajectory may stop. In an implementation, display of the first handwriting trajectory stops at a moment t3. For example, the moment t3 is the same as the moment t2. For another example, the moment t3 is later than the moment t2.

According to the fourth aspect or any implementation of the fourth aspect, the first handwriting trajectory is drawn by the first electronic device, and the second handwriting trajectory is drawn by the second electronic device.

According to the fourth aspect or any implementation of the fourth aspect, the first handwriting trajectory is located on a first layer, and the second handwriting trajectory is located on a second layer. In an implementation, the first layer is superimposed on the second layer.

According to the fourth aspect or any implementation of the fourth aspect, any parameter of a line color, a line thickness, and a line texture of the first handwriting trajectory is the same as or different from a corresponding parameter of the second handwriting trajectory.

According to a fifth aspect, an electronic device is provided, including a display, one or more processors, a memory, and one or more computer programs. The processor is coupled to both the display and the memory, the one or more computer programs are stored in the memory, and when the electronic device runs, the processor may execute the one or more computer programs stored in the memory, the electronic device is enabled to perform the method in any one of the implementations of the foregoing aspects.

For technical effects corresponding to any one of the fifth aspect or the implementations of the fifth aspect, refer to technical effects of corresponding implementations in the foregoing aspects. Details are not described herein again.

According to a sixth aspect, a computer-readable storage medium is provided. The computer-readable storage medium stores a computer program (which may also be referred to as instructions or code), and when the computer program is executed by an electronic device, the electronic device is enabled to perform the method in any one of the implementations of the foregoing aspects.

For technical effects corresponding to any one of the sixth aspect or the implementations of the sixth aspect, refer to technical effects of corresponding implementations in the foregoing aspects. Details are not described herein again.

According to a seventh aspect, a computer program product is provided. When the computer program product runs on an electronic device, the electronic device is enabled to perform the method in any one of the implementations of the foregoing aspects.

For technical effects corresponding to any one of the seventh aspect or the implementations of the seventh aspect, refer to technical effects of corresponding implementations in the foregoing aspects. Details are not described herein again.

According to an eighth aspect, a circuit system is provided. The circuit system includes a processing circuit, and the processing circuit is configured to perform the method in any one of the implementations of the foregoing aspects.

For technical effects corresponding to any one of the eighth aspect or the implementations of the eighth aspect, refer to technical effects of corresponding implementations in the foregoing aspects. Details are not described herein again.

According to a ninth aspect, a chip system is provided. The chip system includes a processor and an interface circuit. The interface circuit is configured to: perform a transceiver function, and send instructions to the processor. When the instructions are executed by the processor, the processor is enabled to perform the method in any one of the implementations of the foregoing aspects.

For technical effects corresponding to any one of the ninth aspect or the implementations of the ninth aspect, refer to technical effects of corresponding implementations in the foregoing aspects. Details are not described herein again.

DESCRIPTION OF EMBODIMENTS

Terms used in the following embodiments are merely intended to describe specific embodiments, but are not intended to limit this application. The terms "one", "a". "the", "the foregoing". "this", and "the one" of singular forms used in this specification and the appended claims of this application are also intended to include forms such as "one or more", unless otherwise specified in the context clearly. It should be further understood that in the following embodiments of this application. "at least one" and "one or more" mean one or at least two (including two). The term "and/or" is used to describe an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner. The term "connection" includes a direct connection and an indirect connection, unless otherwise specified.

In the following description, the terms "first" and "second" are merely intended for a purpose of description, and shall not be interpreted as indicating or implying relative importance or implying a quantity of indicated technical features. Therefore, a feature defined with "first" or "second" may explicitly or implicitly include one or more features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme Exactly, use of the word "example", "for example", or the like is intended to present a relative concept in a specific manner.

Figure 1:
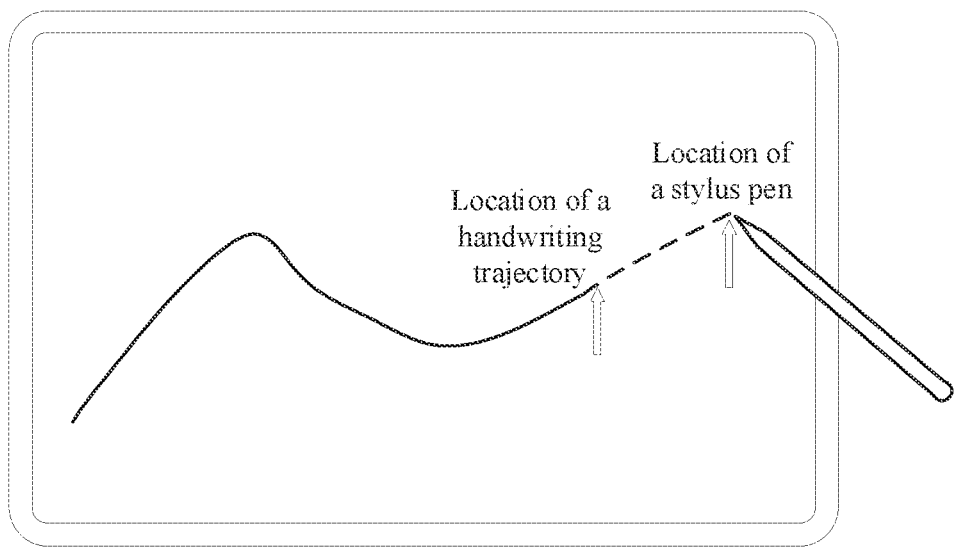
FIG. 1 is a schematic diagram of a scenario to which a stylus pen input method is applicable according to an embodiment of this application.

Writing immediateness is usually represented by a line-drawing latency. A smaller line-drawing latency indicates better writing immediateness, and a larger line-drawing latency indicates poorer writing immediateness. For example, as shown in FIG. 1, a stylus pen is used to draw a line on a screen of an electronic device. Because there is a latency (a line-drawing latency) from a moment when the electronic device receives an input of the stylus pen on the screen to a time when a handwriting trajectory is displayed, there is a specific distance between a location of the stylus pen on the screen and the handwriting trajectory. A longer line-drawing latency indicates a longer distance between the location of the stylus pen on the screen and the handwriting trajectory, and therefore the writing immediateness is poorer.

There are a plurality of factors that affect the writing immediateness. For example, in some products the electronic device receives the input of the stylus pen on the screen of the electronic device, draws a handwriting trajectory based on input information of the stylus pen, synthesizes a handwriting trajectory image, and displays the handwriting trajectory image on the screen. Factors such as a drawing latency a synthesis latency, and a latency for transmitting a generated handwriting trajectory image from a processor to a screen to display all affect the writing immediateness. For another example, in some products, after receiving the input of the stylus pen on the screen of the electronic device, the electronic device transmits, through a wired or wireless connection, the input information of the stylus pen to a processing device for drawing, and synthesizes an image that includes a handwriting trajectory. The processing device sends the generated image to the electronic device, and the image that includes the handwriting trajectory is displayed on the screen of the electronic device. Factors such as a latency for transmitting the input information of the stylus pen from the electronic device to the processing device, a latency for the processing device to generate the image that includes the handwriting trajectory, and a latency for transmitting the image that includes the handwriting trajectory from the processing device to the electronic device all affect the writing immediateness.

Figure 2:
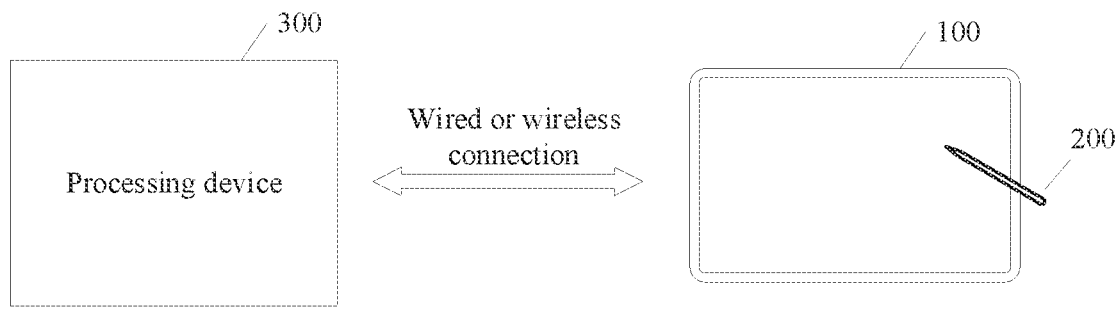
FIG. 2 is a schematic diagram of a system architecture to which a stylus pen input method is applicable according to an embodiment of this application.

For example, a stylus pen input method provided in an embodiment of this application may be applied to a system shown in FIG. 2. The system includes an electronic device 100 that has a touchscreen, a stylus pen 200, and a processing device 300. An application 1 runs on the processing device 300. The electronic device 100 and the processing device 300 are connected in a wired or wireless manner. The processing device 300 projects each interface of the application 1 onto the electronic device 100 for display. Projection is a technology in which interfaces of different electronic devices are synchronously displayed in a wired (for example, high definition multimedia interface (high definition multimedia interface, HDMI)) or wireless (for example. Wi-Fi-based miracast) transmission manner. The electronic device 100 displays an interface of the application 1, that is, displays a projection interface. The electronic device 100 may further receive an input of the stylus pen 200 on the screen (the touchscreen) of the electronic device 100, for example, receive the input of the stylus pen 200 of a user in the projection interface. The electronic device 100 obtains handwriting information such as input coordinates, pressure sensing, and an inclination angle of the stylus pen 200 on the screen, and transmits the handwriting information to the processing device 300 in a wired or wireless manner. The processing device 300 draws a handwriting trajectory on a display interface of the application 1 based on the handwriting information, performs rendering and synthesis, and generates an image that includes the handwriting trajectory. In an implementation, the processing device 300 compresses a generated image into video streaming, and sends the video streaming to the electronic device 100. The electronic device 100 decompresses the video streaming, obtains the image that includes the handwriting trajectory, and displays the image on the screen, that is, updates the projection interface.

The electronic device 100 may include a tablet computer, a handwriting pad, a portable mobile device (like a mobile phone), a hand-held computer, a notebook computer, a netbook, a personal computer (personal computer, PC), a smart home device (like a smart television, a smart screen, or a large screen), a personal digital assistant (personal digital assistant, PDA), a wearable device (like a smartwatch or a smart band), an in-vehicle computer, and the like. This is not limited in embodiments of this application.

The stylus pen 200 may include a stylus, a capacitive stylus, and the like. This is not limited in embodiments of this application.

The processing device 300 may include a personal computer (personal compute, PC), a portable mobile device (like a mobile phone), a hand-held computer, a notebook computer, a netbook, a tablet computer, a smart television, a smart screen, a large screen, and the like. This is not limited in embodiments of this application.

Figure 3A:
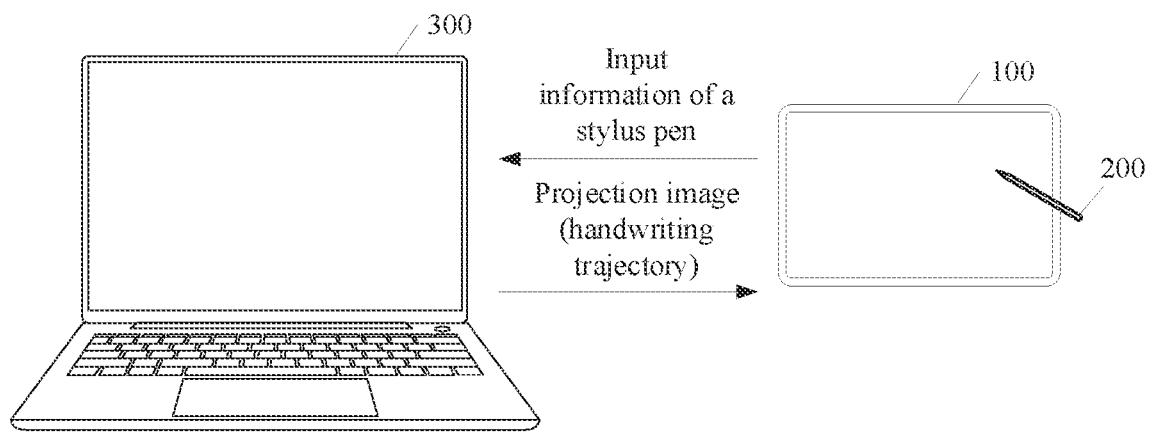
FIG. 3A is a schematic diagram of a system architecture to which a stylus pen input method is applicable according to an embodiment of this application.

An example in which a tablet computer is the electronic device 100, and a PC is the processing device 300 is used. FIG. 3A shows an example of a system to which the stylus pen input method is applicable according to an embodiment of this application. The tablet computer is connected to the PC in a wireless manner. For example, the tablet computer and the PC are connected through wireless fidelity (wireless fidelity, Wi-Fi). The application 1 runs on the PC, and the tablet computer is set as an input device of the PC. The PC further projects the interface of the application 1 onto the tablet computer for display. Each time after receiving an input of the stylus pen of the user in the projection interface, the tablet computer sends, to the PC for processing, handwriting information that is input this time. The PC draws a handwriting trajectory based on the handwriting information, renders and synthesizes the handwriting trajectory and a current display interface of the application 1, and generates and displays an image that includes the handwriting trajectory. In this way, the user may use the stylus pen to draw a line on the tablet computer, to modify the application 1 on the PC, and input a handwriting line (for example, writing or drawing) in the display interface of the application 1.

The PC further projects the image that includes the handwriting trajectory onto the tablet computer for display: In an implementation, the PC compresses the image that includes the handwriting trajectory into video streaming, and transmits the video streaming to the tablet computer. The tablet computer decompresses the video streaming to obtain the image that includes the handwriting trajectory. The tablet computer displays the image that includes the handwriting trajectory. To be specific, the PC can project the image that includes the handwriting trajectory onto the tablet computer. The image including the handwriting trajectory is referred to as a projection image. In this way, both the tablet computer and the PC display the display interface of the application 1, and the display interface includes the handwriting trajectory of the stylus pen.

In this way, in one aspect, the tablet computer does not need to install and run the application 1, and only displays the interface of the application 1; and the tablet computer may draw an image on the application 1 by using a strong computing capability of the PC, and an image generation speed is improved. In another aspect, the PC may receive an input of the stylus pen by using the tablet computer, so that the user can modify a document by using the stylus pen, and input a word in the document, or draw a picture in drawing software, or the like. The user can use the stylus pen to input a word, a graph, and the like on a device that does not have a touchscreen, like the PC.

Figure 3B:
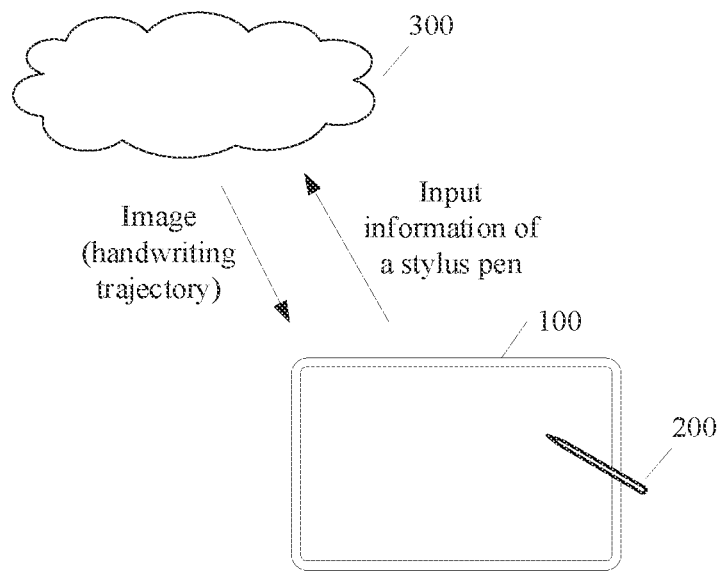
FIG. 3B is a schematic diagram of a system architecture to which a stylus pen input method is applicable according to an embodiment of this application.

It should be noted that, in some embodiments, the processing device 300 may be a server instead of a terminal device. For example, as shown in FIG. 3B, the processing device 300 is a cloud server or a remote server. After receiving the input of the stylus pen, the tablet computer transmits the handwriting information to the server. The server generates, based on the handwriting information, the image that includes the handwriting trajectory, and transmits a generated image to the tablet computer. The tablet computer obtains and displays the image that includes the handwriting trajectory. The tablet computer implements high-performance stylus pen writing by using the powerful computing capability of the server. This provides better writing experience for the user.

In the foregoing process, factors such as a latency for transmitting the handwriting information from the electronic device 100 to the processing device 300, a latency for the processing device 300 to generate the image that includes the handwriting trajectory, and a latency for transmitting the image that includes the handwriting trajectory from the processing device 300 to the electronic device 100 cause a line-drawing latency, so that there is a specific distance between the stylus pen and the handwriting trajectory on the screen of the electronic device 100. Consequently, this brings poor user experience of poor writing immediateness.

An embodiment of this application provides a stylus pen input method. After receiving an input of the stylus pen of a user in a projection interface, an electronic device transmits handwriting information of the input of the stylus pen to the processing device for processing. The processing device generates, based on the handwriting information, a projection image that includes a first handwriting trajectory. The electronic device further performs local drawing based on the input of the stylus pen to generate a second handwriting trajectory. After receiving the projection image from the processing device, the electronic device superimposes the second handwriting trajectory that is locally drawn on the projection image for display (that is, displays an updated projection interface). Because the latency of the handwriting trajectory that is locally drawn by the electronic device is less than a latency for the electronic device to obtain the projection image, the handwriting trajectory that is locally drawn and the handwriting trajectory that is drawn by the processing device are displayed in a superimposed manner, so that a distance between the stylus pen and the handwriting trajectory on the screen of the electronic device can be reduced, the line-drawing latency of the input of the stylus pen on the electronic device is reduced and writing immediateness of the stylus pen is improved.

Figure 4:
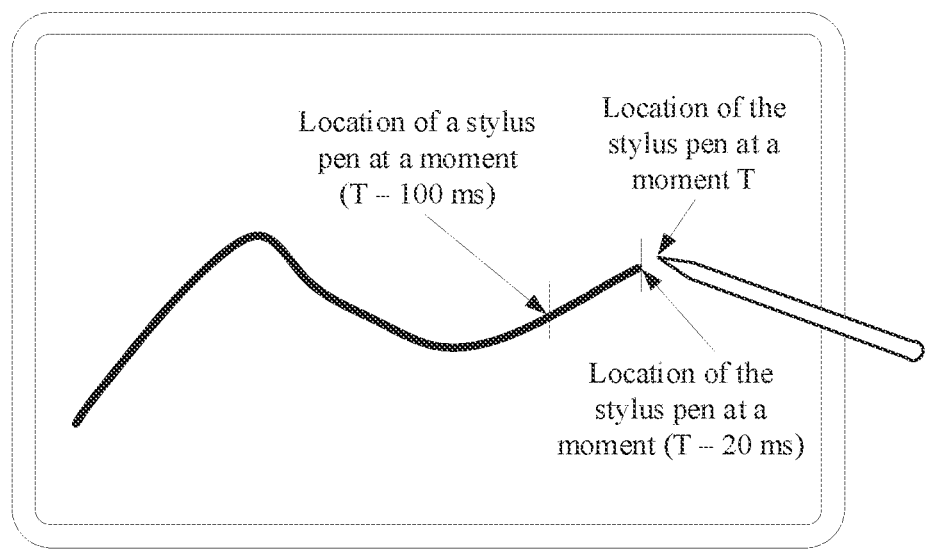
FIG. 4 is an example diagram of a scenario of a stylus pen input method according to an embodiment of this application.

For example, as shown in FIG. 4, the latency for the electronic device to obtain the projection image is 100 milliseconds (ms), and a latency of the handwriting trajectory that is locally drawn by the electronic device is 20 ms. At a moment T, the handwriting trajectory in the projection image obtained by the electronic device from the processing device is drawn based on an input of the stylus pen at (T−100 ms), and the handwriting trajectory that is locally drawn is drawn based on an input of the stylus pen at (T−20 ms). The handwriting trajectory that is locally drawn reduces a distance between the handwriting trajectory that is drawn by the processing device and the stylus pen.

Figure 5:
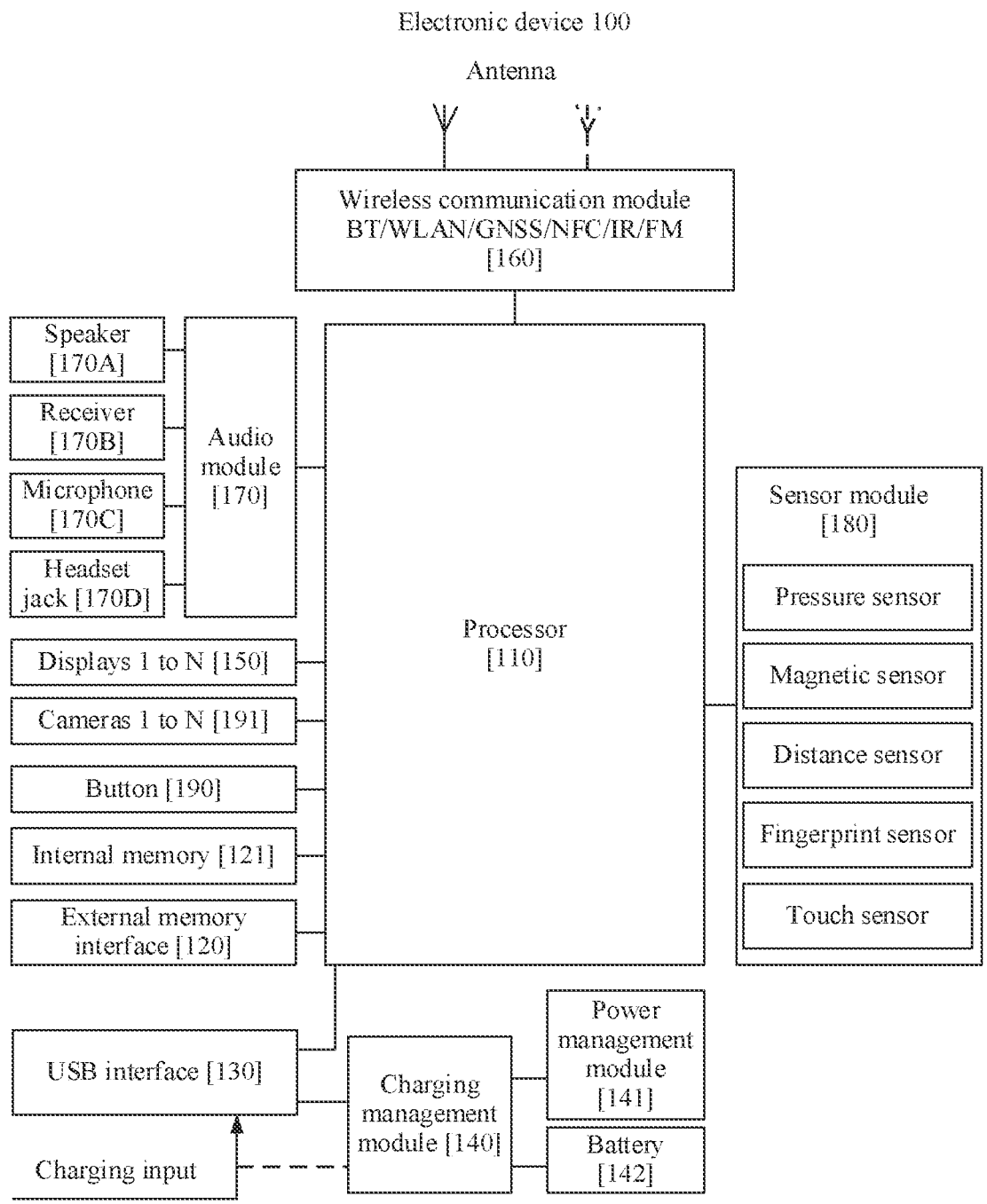
FIG. 5 is a schematic diagram of a hardware structure of an electronic device according to an embodiment of this application.

For example, FIG. 5 is a schematic diagram of a structure of the electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, a display 150, an antenna, a wireless communication module 160, an audio module 170, a speaker 170A, a receiver 170B, a microphone 170C, a headset jack 170D, a sensor module 180, a button 190, a camera 191, and the like. The sensor module 180 may include a pressure sensor, a magnetic sensor, a distance sensor, a fingerprint sensor, a touch sensor, and the like.

It may be understood that the structure shown in this embodiment of the present invention does not constitute a specific limitation on the electronic device 100. In some other embodiments of this application, the electronic device 100 may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor. DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus, USB) interface, and/or the like.

The I2C interface is a two-way synchronization serial bus, and includes a serial data line (serial data line, SDA) and a serial clock line (serial clock line. SCL). In some embodiments, the processor 110 may include a plurality of groups of I2C buses. The processor 110 may be separately coupled to the touch sensor, a charger, a flash, the camera 191, and the like through different I2C bus interfaces. For example, the processor 110 may be coupled to the touch sensor through the I2C interface, so that the processor 110 communicates with the touch sensor through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be configured to: perform audio communication, and sample, quantize, and encode an analog signal. In some embodiments, the audio module 170 may be coupled to the wireless communication module 160 through the PCM bus interface. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component like the display 150 or the camera 191. The MIPI interface includes a camera serial interface (camera serial interface. CSI), a display serial interface (display serial interface, DSI), and the like. In some embodiments, the processor 110 communicates with the camera 191 through the CSI, to implement a photographing function of the electronic device 100. The processor 110 communicates with the display 150 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 191, the display 150, the wireless communication module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect the charger to charge the electronic device 100, or may be configured to perform data transmission between the electronic device 100 and a peripheral device, or may be configured to connect a headset for playing audio through by using the headset. Alternatively, the interface may be configured to connect to another electronic device, for example, an AR device.

It may be understood that an interfacing relationship between modules illustrated in embodiments of the present invention is merely an example for description, and does not constitute a limitation on the structure of the electronic device 100. In some other embodiments of this application, the electronic device 100 may alternatively be interfaced in a different manner from that in the foregoing embodiments, or by combining a plurality of interfacing manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 150, the camera 191, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna, the wireless communication module 160, the modem processor, the baseband processor, and the like.

The antenna is configured to transmit and receive an electromagnetic wave signal. Each antenna in the electronic device 100 may be configured to cover one or more communication frequency bands. Different antennas may be multiplexed to improve antenna utilization. For example, the antenna may be multiplexed as a diversity antenna in a wireless local area network. In some other embodiments, the antenna may be used in combination with a tuning switch.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 150. In some embodiments, the modem processor may be an independent device. In some other embodiments, the modem processor may be independent of the processor 110, and is disposed in the same device as another function module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna.

The electronic device 100 implements a display function by using the GPU, the display 150, the application processor, and the like. The GPU is a microprocessor for image processing, and is connected to the display 150 and the application processor. The GPU is configured to: perform mathematical and geometric computation, and render an image. The processor 110 may include one or more GPUs that execute program instructions to generate or change display information.

The display 150 is configured to display an image, a video, and the like. The display 150 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode. AMOLED), a flexible light-emitting diode (flexible light-emitting diode. FLED), a mini-LED, a micro-LED, a micro-OLED, a quantum dot light emitting diode (quantum dot light emitting diode, QLED), or the like. In some embodiments, the electronic device 100 may include one or N displays 150, where N is a positive integer greater than 1.

The electronic device 100 may implement a photographing function by using the ISP, the camera 191, the video codec, the GPU, the display 150, the application processor, and the like.

The ISP is configured to process data fed back by the camera 191. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 191.

The camera 191 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 191, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various functional applications of the electronic device 100 and data processing. The internal memory 121 may include a program storage region and a data storage region. The program storage region may store an operating system an application required by at least one function (for example, a sound play function and an image play function), and the like. The data storage area may store data (such as audio data and a phone book) and the like created during use of the electronic device 100. In addition, the internal memory 121 may include a high-speed random access memory; and may further include a nonvolatile memory, for example, at least one magnetic disk storage device, a flash storage device, and a universal flash storage (universal flash storage, UFS).

The electronic device 100 may use the audio module 170, the speaker 170A, the receiver 170B, the microphone 170C, the headset jack 170D, the application processor, and the like to implement an audio function, for example, music playing and recording.

The audio module 170 is configured to convert digital audio information into an analog audio signal for output, and is also configured to convert analog audio input into a digital audio signal. The audio module 170 may be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call through the speaker 170A.

The receiver 170B, also referred to as an "earpiece", is configured to convert an electrical audio signal into a sound signal. When a call is answered or voice information is received through the electronic device 100, the receiver 170B may be put close to a human ear for listening to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. The electronic device 100 may be provided with at least one microphone 170C. In some other embodiments, the electronic device 100 may be provided with two microphones 170C, to implement a noise reduction function, in addition to collecting the sound signal. In some other embodiments, the electronic device 100 may alternatively be provided with three, four, or more microphones 170C, to collect a sound signal, implement noise reduction, identify a sound source, implement a directional recording function and the like.

The headset jack 170D is configured to connect to a wired headset. The headset jack 170D may be the USB interface 130, or may be a 3.5 mm open mobile terminal platform (open mobile terminal platform. OMTP) standard interface or cellular telecommunications industry association of the USA (cellular telecommunications industry association of the USA, CTIA) standard interface.

The magnetic sensor includes a Hall sensor. The electronic device 100 may detect opening and closing of a flip cover by using the magnetic sensor. The distance sensor is configured to measure a distance. The electronic device 100 may measure a distance in an infrared manner or a laser manner. In some embodiments, in a photographing scenario, the electronic device 100 may measure a distance by using the distance sensor to implement quick focusing. The fingerprint sensor is configured to collect a fingerprint. The electronic device 100 may use a feature of the collected fingerprint to implement fingerprint-based unlocking, application lock access, fingerprint-based photographing, fingerprint-based call answering, and the like.

The touch sensor is also referred to as a "touch panel". The touch sensor may be disposed on the display 150, and the touch sensor and the display 150 form a touchscreen, which is also referred to as a "touch screen". The touch sensor is configured to detect a touch operation performed on or near the touch sensor. The touch sensor may transfer the detected touch operation to the application processor to determine a type of the touch event. A visual output related to the touch operation may be provided on the display 150. In some other embodiments, the touch sensor may alternatively be disposed on a surface of the electronic device 100, and is at a location different from that of the display 150.

The pressure sensor is configured to sense a pressure signal, and may convert the pressure signal into an electrical signal. In some embodiments, the pressure sensor may be disposed on the display 150. There are a plurality of types of pressure sensors, such as a resistive pressure sensor, an inductive pressure sensor, and a capacitive pressure sensor. The capacitive pressure sensor may include at least two parallel plates made of conductive materials. When a force is applied to the pressure sensor, capacitance between electrodes changes. The electronic device 100 determines pressure intensity based on a capacitance change. When a touch operation is performed on the display 150, the electronic device 100 detects intensity of the touch operation by using the pressure sensor The electronic device 100 may further calculate a touch location based on a detection signal of the pressure sensor. In some embodiments, the pressure sensor is configured to detect an input location, pressure sensing, and the like of a stylus pen.

The button 190 includes a power button, a volume button, and the like. The button 190 may be a mechanical button, or may be a touch button. The electronic device 100 may receive a button input, and generate a button signal input related to a user setting and function control of the electronic device 100.

An example in which a tablet computer is an electronic device 100, a PC is an electronic device 300 is used below to describe in detail a stylus pen input method according to an embodiment of this application.

Figure 6:
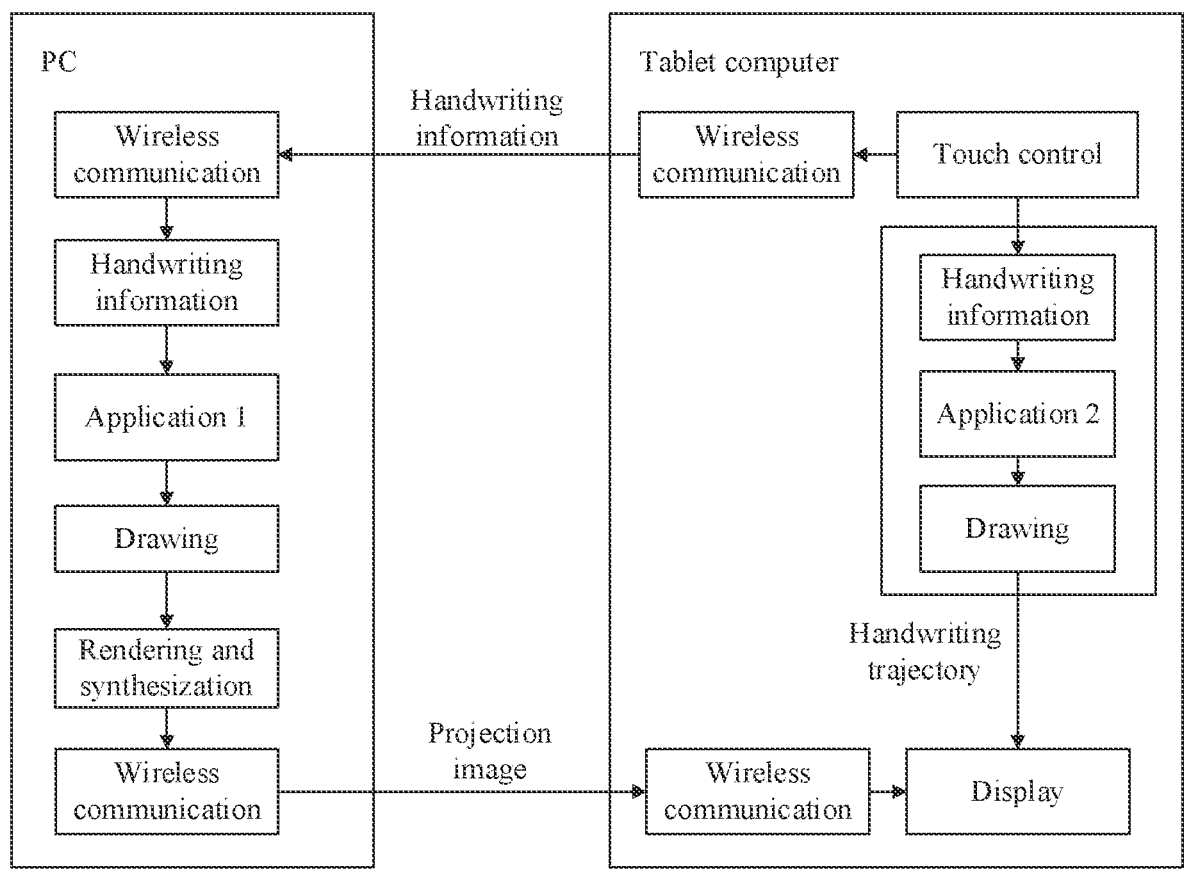
FIG. 6 is a schematic diagram of a stylus pen input method according to an embodiment of this application.

As shown in FIG. 6, an application 1 runs on the PC. For example, the application 1 is a drawing application. The tablet computer is set as an input device of the PC. The PC further projects an interface of the application 1 onto the tablet computer for display. A user may use a stylus pen to draw a line on the tablet computer, to implement a handwriting input on the PC. For example, the user uses the stylus pen to draw a line on a screen (a projection interface) of the tablet computer, to implement to input a drawing handwriting on a display interface of the drawing application.

In an implementation, a touch control module of the tablet computer receives an input of the stylus pen, and obtains corresponding handwriting information based on each input, the handwriting information includes any one or any combination of the following: input coordinates, pressure sensing, an inclination angle, or the like. An input of the stylus pen at a point (for example, a pixel point) on the screen of the tablet computer is used as an input.

Figure 7A:
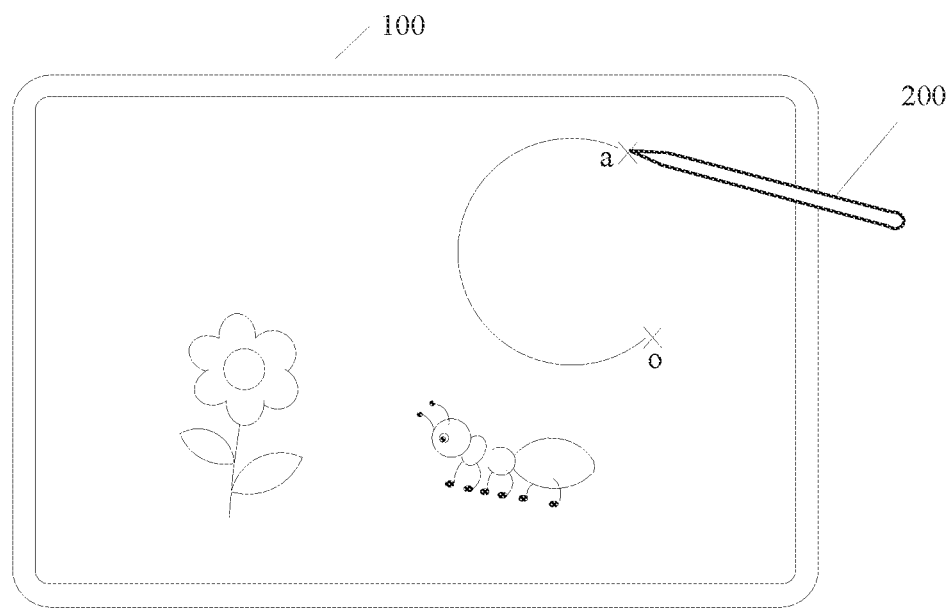
FIG. 7A is an example diagram of a scenario of a stylus pen input method according to an embodiment of this application.

For example, as shown in FIG. 7A, the user uses the stylus pen 200 to draw a line on the tablet computer 100. An input of the stylus pen 200 at a point a on the screen of the tablet computer 100 is referred to as an input a (a first input).

Handwriting information corresponding to the input a is referred to as handwriting information a (first handwriting information).

Still refer to FIG. 6. The touch control module of the tablet computer sends the handwriting information a to the PC through wireless communication (for example, Bluetooth). The application 1 running on the PC receives the handwriting information a, and draws a handwriting trajectory based on the handwriting information a. In an implementation, the application 1 draws a point based on the handwriting information a. For example, the application 1 determines a location of a drawing point based on input coordinates of the handwriting information, determines a grayscale of the drawing point based on pressure sensing of the handwriting information, and determines a size of the drawing point based on an inclination angle of the handwriting information. The point that is drawn based on the handwriting information a is connected to a drawn point on the PC to form a first handwriting trajectory. For example, the first handwriting trajectory includes points that are drawn by the PC based on an input in a process in which the stylus pen moves from a point o shown in FIG. 7A to the point a. The application 1 further performs rendering and synthesis based on a current display interface and the first handwriting trajectory, to generate a first projection image that includes the first handwriting trajectory.

In an example, the application 1 predicts, based on a process in which the handwriting information draws the handwriting trajectory, a segment of a handwriting trajectory by using a stroke estimate algorithm, based on a drawn handwriting trajectory, and combines an actually drawn handwriting trajectory and the predicted handwriting trajectory. Because the predicted handwriting trajectory is displayed in advance, visual effect that a line-drawing display speed is fast is formed. In this way, a latency for drawing the handwriting trajectory on the PC can be reduced, that is, a latency for the PC to generate a first image can be reduced. The stroke estimate algorithm is used to pre-estimate and pre-calculate a stroke location based on a movement rule of a known stroke. Specifically, a conventional stroke estimate algorithm (for example, Gaussian distribution) in the conventional technology may be used. This is not limited in embodiments of this application.

Optionally, the PC compresses the first projection image into video streaming. The PC sends the video streaming to the tablet computer through wireless communication (for example, Wi-Fi). The tablet computer receives the video streaming, and decompresses the video streaming to obtain the first projection image. The tablet computer displays the first projection image (the first projection image includes the first handwriting trajectory).

Because there is time consuming in a process in which the handwriting information is transmitted from the tablet computer to the PC, the first projection image is transmitted from the PC to the tablet computer, and the PC generates the first projection image, there is a latency for the tablet computer to obtain the first projection image. Within the latency, the user continues to perform input on the display of the tablet computer by using the stylus pen. There is a specific distance between the first handwriting trajectory displayed on the tablet computer and the stylus pen.

According to the stylus pen input method provided in this embodiment of this application, the touch control module of the tablet computer receives the input of the stylus pen, and an application 2 running on the tablet computer further locally draws a handwriting trajectory based on handwriting information that is input this time. In an implementation, the application 2 draws a point based on handwriting information of an input. For example, the application 2 determines a location of a drawing point based on input coordinates of the handwriting information, determines a grayscale of the drawing point based on pressure sensing of the handwriting information, and determines a size of the drawing point based on an inclination angle of the handwriting information. For a specific method for drawing the handwriting trajectory by the tablet computer based on the handwriting information, refer to a means in a conventional technology. This is not limited in embodiments of this application.

A point drawn by the application 2 based on the current input is connected to a point drawn by the application 2 to form a second handwriting trajectory.

Figure 7B:
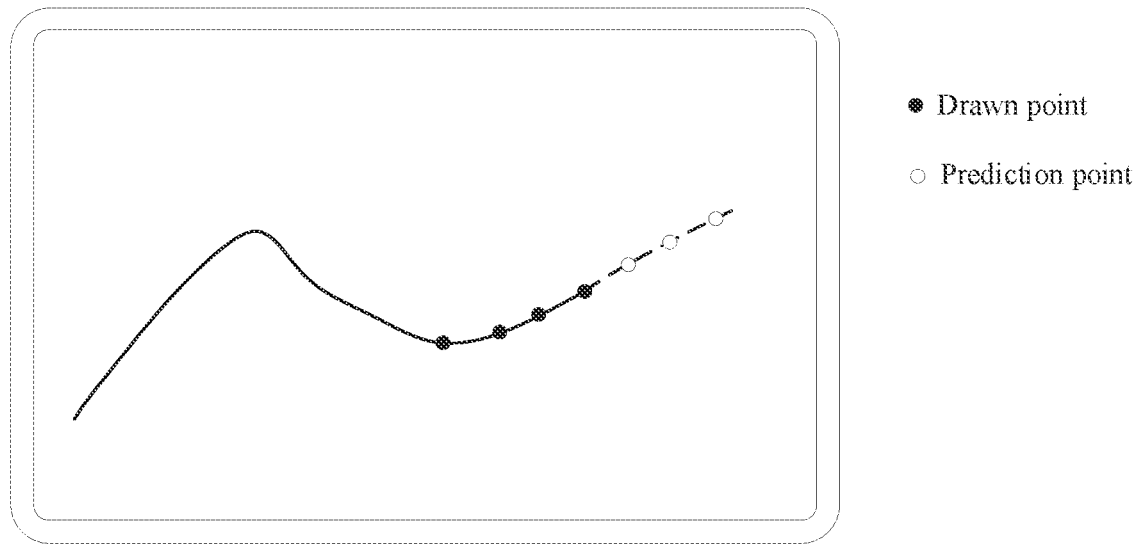
FIG. 7B is an example diagram of a scenario of a stylus pen input method according to an embodiment of this application.

In an example, the application 2 predicts, based on a process in which the handwriting information draws the handwriting trajectory, a segment of a handwriting trajectory by using a stroke estimate algorithm, based on a drawn handwriting trajectory, and combines an actually drawn handwriting trajectory and a predicted handwriting trajectory. For example, as shown in FIG. 7B, a prediction point is calculated based on the drawn point by using the stroke estimate algorithm, and the predicted handwriting trajectory (the prediction points are connected to form the predicted handwriting trajectory) is displayed in advance, to forming visual effect that a line-drawing display speed is fast. In this way, a latency for the tablet computer to draw the handwriting trajectory can be reduced. In some examples, the application 2 may further use manners such as compulsory single-frame drawing and synthesis, to reduce a latency for drawing the handwriting trajectory.

It may be understood that, the application 2 on the tablet computer only draws the handwriting trajectory, and does not need to generate a complete image of the display interface of the application 1. Therefore, a requirement on computing power of the tablet computer is low, and the tablet computer may be applicable to an electronic device with a simple system-on-a-chip (system-on-a-chip, SOC).

The tablet computer superimposes the second handwriting trajectory that is locally drawn on the first projection image for display (that is, displays an updated projection interface). In an example, the display image (the updated projection interface) of the tablet computer includes two layers. The bottom layer is a projection layer, the top layer is a local layer, and the local layer is suspended in the projection layer. The tablet computer uses the received first projection image as the projection layer, and uses a handwriting trajectory that is locally drawn as the local layer. The tablet computer displays an image that is synthesized by the projection layer and the local layer.

There is a first latency for the tablet computer to obtaining the projection image, and there is a second latency for locally drawing the handwriting trajectory. In an implementation, a display image of the tablet computer at a moment T is an image obtained by synthesizing the first projection image generated by the PC based on the first input at a moment (T−the first latency) and the second handwriting trajectory that is drawn by the tablet computer based on a second input at a moment (T−the second latency).

Figure 7C:
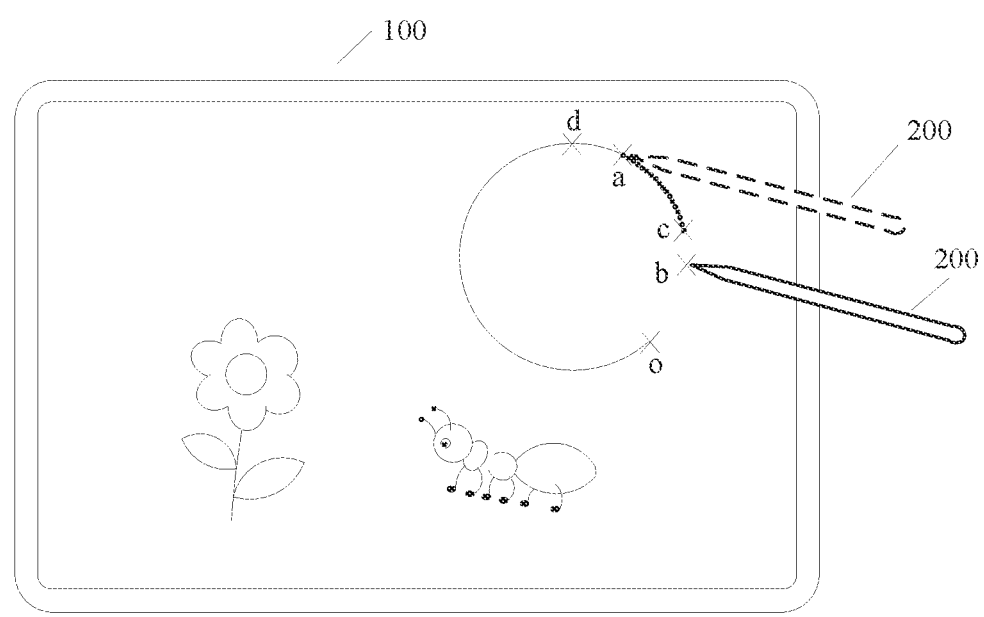
FIG. 7C is an example diagram of a scenario of a stylus pen input method according to an embodiment of this application.

For example, the first latency is 100 ms, and the second latency is 20 ms. As shown in FIG. 7C, the tablet computer receives the first input (the input a) of the stylus pen at a (T−100 ms) moment, sends the handwriting information a corresponding to the input a to the PC, and obtains the first projection image from the PC. The first projection image includes the first handwriting trajectory; and the first handwriting trajectory includes the points that are drawn by the PC based on the input in the process in which the stylus pen moves from the point o to the point a. Within the first latency (100 ms) for the tablet computer to obtain the first projection image, the stylus pen moves from the point a to a point b, and the stylus pen moves to the point b at the moment T.

The tablet computer receives the second input (an input c) of the stylus pen at a moment (T−20 ms), and locally draws the second handwriting trajectory based on the input c. The second handwriting trajectory includes points that are drawn by the tablet computer based on the input in the process in which the stylus pen moves from the point a to the point c. It may be understood that the second handwriting trajectory is a continuation trajectory of the first handwriting trajectory.

The projection layer of the display image of the tablet computer at the moment T is the first projection image (including the first handwriting trajectory), and the local layer is the second handwriting trajectory. The second handwriting trajectory that is locally drawn reduces a distance between the first handwriting trajectory and the stylus pen, reduces a line-drawing latency, and improves the writing immediateness of the stylus pen.

In an implementation, the application 2 determines a length of drawing the second handwriting trajectory based on the first latency and the second latency. For example, the tablet computer receives the second input of the stylus pen at the moment (T−the second latency), and connects points that are drawn based on the input in duration (the first latency−the second latency) before the second input to form the second handwriting trajectory.

For example, as shown in FIG. 7C, the tablet computer receives an input c of the stylus pen at a moment (T−20 ms), and connects, as the second handwriting trajectory; points that are drawn based on an input (that is, an input between the point a and the point c) within 80 ms (100 ms−20 ms) before the input c. The length of the second handwriting trajectory is a length of a trajectory length between the point a and the point c. In this implementation, the second handwriting trajectory is the continuation trajectory of the first handwriting trajectory, and the second handwriting trajectory does not coincide with the first handwriting trajectory.

It may be understood that, in some other embodiments, the length of the second handwriting trajectory may also be greater than the length of the trajectory length between the point a and the point c. For example, the points that are drawn based on an input (an input between a point d and the point c in the FIG. 7C) within 150 ms before the input c are connected as the second handwriting trajectory. For another example, the points that are drawn based on an input between an input o and the input c are connected as the second handwriting trajectory. This is not limited in embodiments of this application. In this implementation, the second handwriting trajectory coincides with a part of the first handwriting trajectory, and the second handwriting trajectory includes the continuation part of the first handwriting trajectory. It may be understood that as the continuation of the first handwriting trajectory, the second handwriting trajectory may alternatively completely coincide with the first handwriting trajectory.

It should be noted that a correspondence between the projection image obtained from the PC and the handwriting trajectory that is locally drawn when the tablet computer synthesizes the display image is not limited in embodiments of this application. For example, in some other embodiments, the tablet computer obtains the projection image at the moment T, and obtains a handwriting trajectory that is locally drawn at a moment (T+t), where t>0); and synthesizes the projection image obtained at the moment T and the handwriting trajectory that is locally drawn obtained at the moment (T+t) onto the display image for display. In some other embodiments, the tablet computer obtains the handwriting trajectory that is locally drawn at the moment T, and obtains the projection image at the moment (T+t), where t>0); and synthesizes the handwriting trajectory that is locally drawn obtained at the moment T and the projection image obtained at the moment (T+t) onto the display image for display.

Figure 8A:
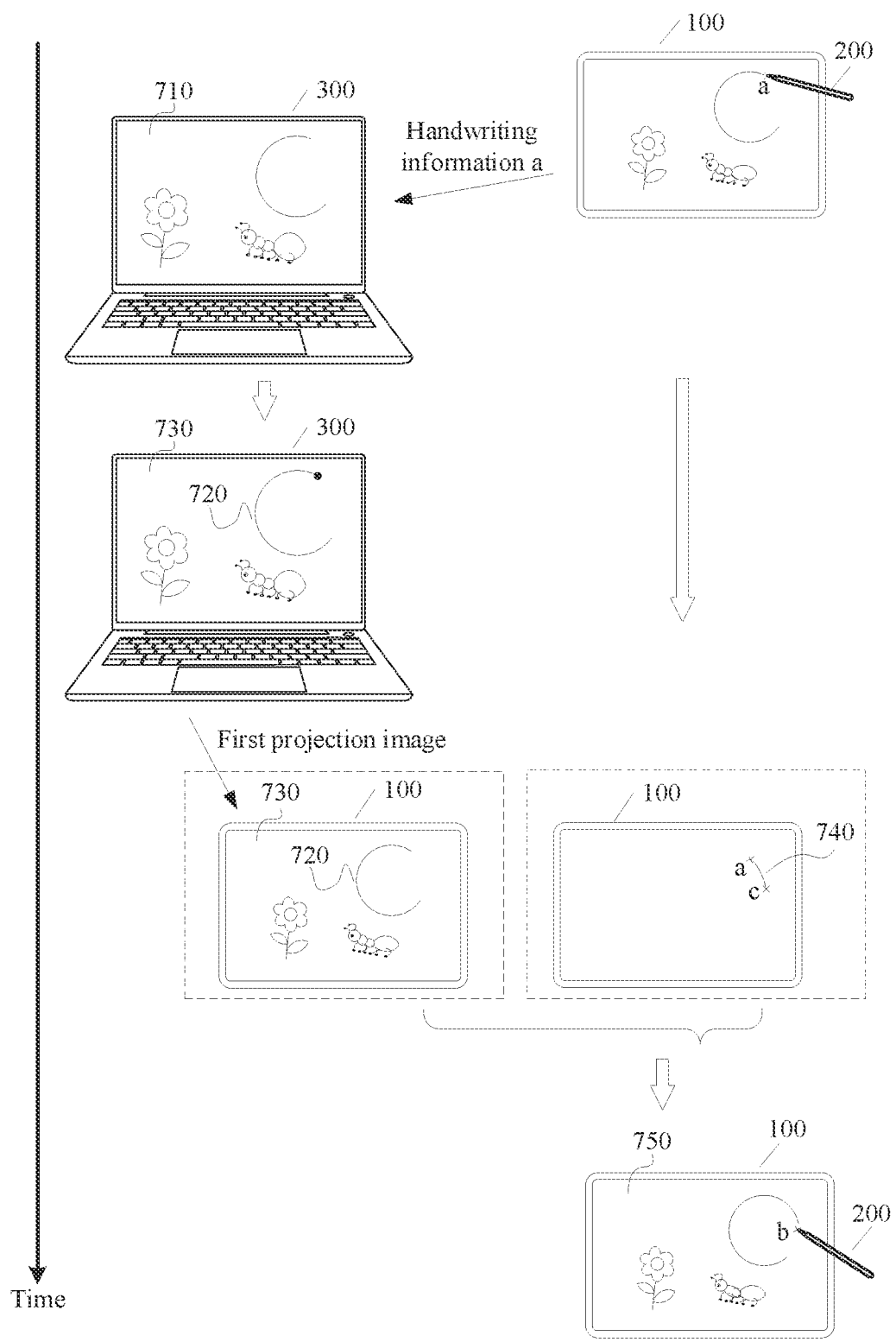
FIG. 8A is an example diagram of a scenario of a stylus pen input method according to an embodiment of this application.

For example, FIG. 8A shows a specific example of the stylus pen input method according to an embodiment of this application. As shown in FIG. 8A, the tablet computer 100 displays the display interface of the drawing application, and receives, at a first moment, an input of a point a on the screen by the stylus pen 200 to obtain the handwriting information a. The tablet computer 100 sends the handwriting information a to the PC 300. The PC 300 draws on the display interface 710 of the drawing application based on the handwriting information a, and a current drawing point and a drawn point are connected to form a handwriting trajectory 720. The PC 300 performs rendering and synthesis, to generate a first projection image 730 that includes the handwriting trajectory 720. The PC 300 compresses the first projection image 730 into video streaming, and sends the video streaming to the tablet computer 100. The tablet computer 100 receives the video streaming, and obtains the first projection image 730.

In a process in which the tablet computer 100 transmits the handwriting information a to the PC 300 and the tablet computer 100 receives the first projection image 730, the user continues to perform input by using the stylus pen 200, and the tablet computer 100 continues to receive the input of the stylus pen 200. For example, as shown in FIG. 8A, the stylus pen 200 moves from the point a to the point b. The tablet computer receives, at a second moment, an input of the stylus pen 200 at the point c on the screen, obtains corresponding handwriting information c, and performs drawing based on the handwriting information c. The tablet computer 100 connects the points that are drawn based on an input between an input a and an input c to form a handwriting trajectory 740.

The tablet computer 100 displays an updated display interface of the drawing application, that is, displays an image 750 (the handwriting trajectory 740 is superimposed on the first projection image 730 for display). A projection layer of the image 750 is the first projection image 730, and a local layer is the handwriting trajectory 740.

Figure 8B:
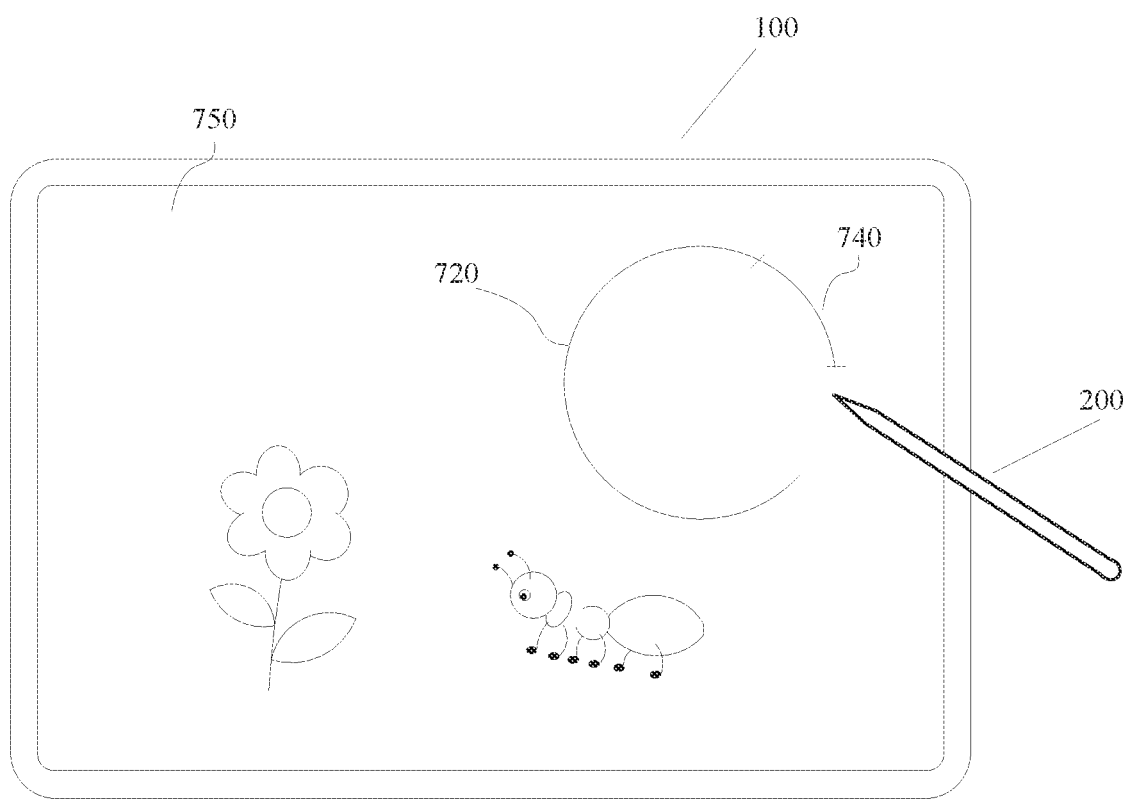
FIG. 8B is an example diagram of a scenario of a stylus pen input method according to an embodiment of this application.

As shown in FIG. 8B, on the image 750, the handwriting trajectory 740 (the second handwriting trajectory) is displayed, so that a distance between the handwriting trajectory 720 (the first handwriting trajectory) and the stylus pen 200 is reduced, and a line-drawing latency of the tablet computer 100 is reduced.

It should be noted that an interface in a dashed-line box in FIG. 8A is not separately displayed, and is merely used as an intermediate step for example description, to facilitate understanding.

It should be noted that the PC 300 in FIG. 8A displays the interface 710 and the first projection image 730. It may be understood that, in some other embodiments, the PC 300 may not display the interface 710 and the first projection image 730, and only provides a computing capability for the tablet computer 100.

It may be understood that, the tablet computer receives the second input (the input c) of the stylus pen at the moment (T−20 ms), and further sends the handwriting information c corresponding to the second input to the PC. The application 1 running on the PC receives the handwriting information c, performs drawing based on the handwriting information c, and performs rendering and synthesis based on a current display interface and a drawing point of the application 1, to generate a second projection image that includes a handwriting trajectory 3. The PC compresses the second projection image into video streaming. The PC sends the video streaming to the tablet computer through wireless communication (for example, Wi-Fi). The tablet computer receives the video streaming, and decompresses the video streaming to obtain the second projection image. Further, the tablet computer superimposes a handwriting trajectory 4 that is locally drawn on the second projection image for display.

The handwriting trajectory 3 includes points that are drawn by the PC based on an input in the process in which the stylus pen moves from the point o to the point c. The second handwriting trajectory includes points that are drawn by the tablet computer based on an input in the process in which the stylus pen moves from the point a to the point c. After the tablet computer displays the second projection image, the handwriting trajectory 3 may cover the second handwriting trajectory.

That is, a point that is locally drawn by the tablet computer is covered by a point that is drawn by the PC based on a same input after specific duration. In an implementation, after displaying a handwriting trajectory that is locally drawn by the tablet computer for preset duration, the tablet computer stops display of the handwriting trajectory.

It should be noted that, in this embodiment of this application, an example in which the PC and the tablet computer perform drawing once each time the PC and the tablet computer receive an input is used for description. In some other embodiments, after receiving a plurality of input, the PC and the tablet computer may also perform drawing once based on the plurality of inputs. For example, drawing is performed once based on an input of the stylus pen received within 10 ms. This is not limited in embodiments of this application.

Figure 9:
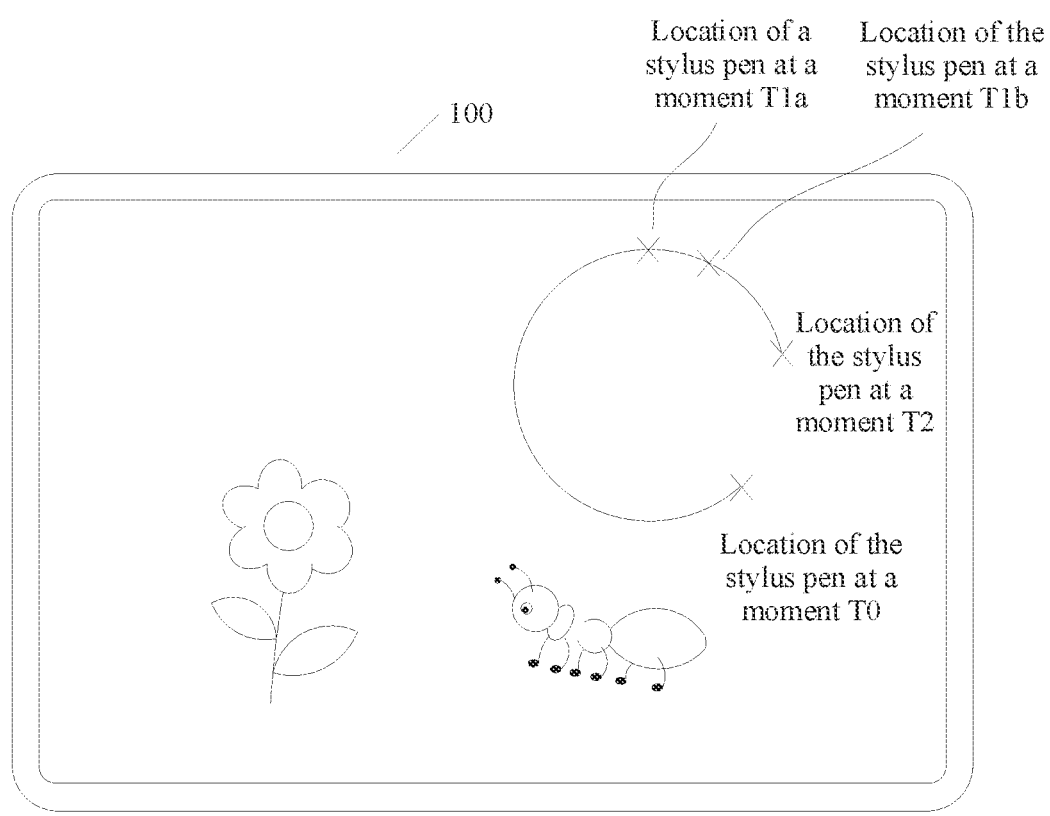
FIG. 9 is an example diagram of a scenario of a stylus pen input method according to an embodiment of this application.

For example, as shown in FIG. 9, at a moment T0, the tablet computer 100 displays a projection interface of the PC, and the projection interface does not include handwriting. The user draws a line on the tablet computer 100 by using the stylus pen. The tablet computer 100 receives an input of the stylus pen. For example, the tablet computer uses an input of the stylus pen received within first duration as an input, and sends handwriting information corresponding to the input to the PC to draw a handwriting trajectory. For example, in FIG. 9, an input of the stylus pen between the moment T0 and a moment T1b is a first input. The tablet computer 100 sends handwriting information corresponding to the first input to the PC 300. The PC 300 generates, based on the first input, a projection image that includes the first handwriting trajectory. The tablet computer 100 obtains the projection image that includes the first handwriting trajectory.

The tablet computer 100 further performs local drawing based on the second input. In an example, an input time period of the second input is after an input time period of the first input, and does not overlap that of the first input at all. For example, in FIG. 9, an input of the stylus pen between the moment T1b and a moment T2 is the second input. The tablet computer 100 performs local drawing based on the input of the stylus pen between the moment T1b and the moment T2, to generate the second handwriting trajectory. The second handwriting trajectory is the continuation trajectory of the first handwriting trajectory, and the second handwriting trajectory does not coincide with the first handwriting trajectory. In another example, a start moment of the input time period of the second input is after a start moment of the input time period of the first input, and the input time period of the second input partially overlaps the input time period of the first input. For example, in FIG. 9, the input of the stylus pen between the moment T1a and the moment T2 is the second input, where the moment T1a is after the moment T0 and before the moment T1b. The tablet computer 100 performs local drawing based on the input of the stylus pen between the moment T1a and the moment T2, to generate the second handwriting trajectory. The second handwriting trajectory coincides with the part of the first handwriting trajectory, and the second handwriting trajectory includes the continuation part of the first handwriting trajectory.

The tablet computer 100 displays an updated projection interface. A projection image that includes the first handwriting trajectory is displayed on a projection layer of the updated projection interface, and the second handwriting trajectory (a local layer) is displayed on the projection image in a superimposed manner. The second handwriting trajectory includes the continuation part of the first handwriting trajectory, so that a distance between the first handwriting trajectory and the stylus pen is reduced, and a line-drawing latency of the tablet computer 100 is reduced.

In an implementation, the tablet computer 100 determines a length of the input time period of the second input based on the first latency and/or the second latency. The first latency includes a latency for the tablet computer 100 to obtain the projection image from the PC, and the second latency includes a latency for the tablet computer 100 to locally draw the second handwriting trajectory. In an example, the length of the input time period of the second input=(the first latency, the second latency). In this way, the second handwriting trajectory drawn based on the second input is the continuation trajectory of the first handwriting trajectory drawn based on the first input, and the second handwriting trajectory does not coincides with the first handwriting trajectory: In another example, the length of the input time period of the second input=the first latency. In this way, the second handwriting trajectory drawn based on the second input coincides with a part of the first handwriting trajectory drawn based on the first input, and the second handwriting trajectory includes the continuation part of the first handwriting trajectory. For example, refer to FIG. 9. The first latency=(T2−T1a), and the second latency=(T1b−T1a). In an implementation, the length of the input time period of the second input=(the first latency—the second latency)=((T2−T1a)−(T1b−T1a))=(T2−T1b), that is, the second input is the input of the stylus pen between the moment T1b and the moment T2. In another implementation, the length of the input time period of the second input=the first latency=(T2−T1a), that is, the second input is input of the stylus pen between the moment T1a and the moment T2.

Figure 10:
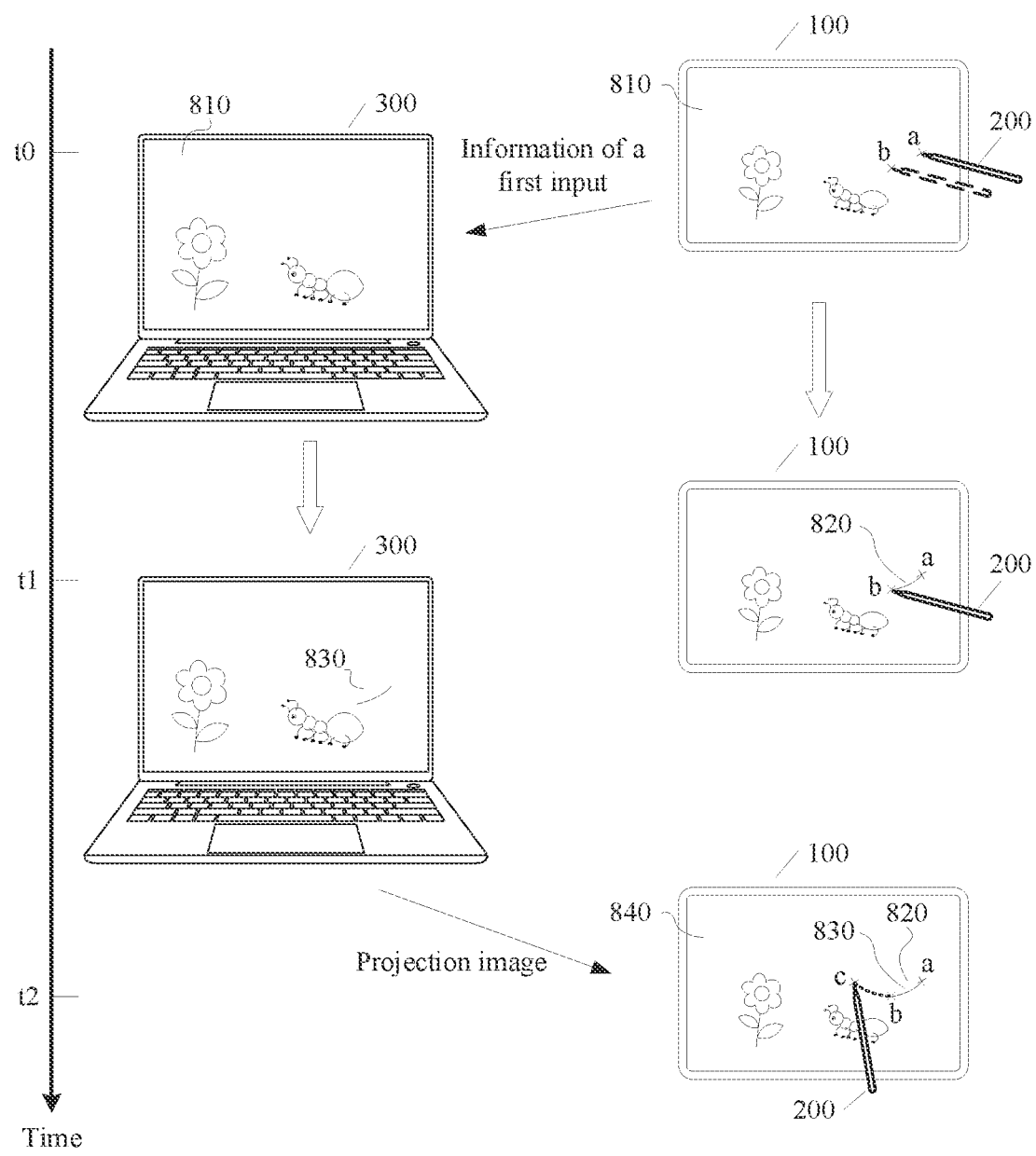
FIG. 10 is an example diagram of a scenario of a stylus pen input method according to an embodiment of this application.

FIG. 10 shows a scenario example of the stylus pen input method according to an embodiment of this application.

As shown in FIG. 10, the application 1 runs on the PC 300. For example, the application 1 is a drawing application. The tablet computer 100 is set as an input device of the PC 300. The PC 300 projects an interface of the application 1 onto the tablet computer 100 for display. The tablet computer 100 displays an interface 810 of the drawing application. The user uses the stylus pen 200 to draw a line in the interface 810. For example, at the moment t0, the tablet computer 100 receives an input (a first input) that the stylus pen 200 moves from a point a to a point b in the interface 810. The tablet computer 100 sends, to the PC 300, information of input that the stylus pen 200 moves from the point a to the point b, and performs local drawing based on the information of the input. For example, the tablet computer 100 locally draws a handwriting trajectory 820. At the moment t1, the tablet computer 100 displays the handwriting trajectory 820 in the interface 810. In addition, the PC 300 receives the information of input that the stylus pen 200 moves from the point a to the point b, and generates, based on the information, a projection image that includes a handwriting trajectory 830. The PC 300 sends the projection image that includes the handwriting trajectory 830 to the tablet computer 100. The tablet computer 100 obtains the projection image that includes the handwriting trajectory 830, refreshes the projection interface at the moment t2, and displays, at a projection layer, the projection image that includes the handwriting trajectory 830.

It may be understood that a local layer of a refreshed projection interface includes the handwriting trajectory 820, the projection layer includes the handwriting trajectory 830, and the local layer is superimposed on the projection layer. Both the handwriting trajectory 820 and the handwriting trajectory 830 are drawn based on an input of moving the stylus pen 200 from the point a to the point b, and the handwriting trajectory 820 and the handwriting trajectory 830 are identical line trajectories.

Because a latency for the tablet computer 100 to perform local drawing is less than a latency for obtaining the projection image from the PC 300, the moment t, is earlier than the moment t2. In other words, displaying of the handwriting trajectory that is locally drawn by the tablet computer 100 on the screen of the tablet computer 100 is faster than displaying of the handwriting trajectory by the PC 300, so that the handwriting trajectory input by the stylus pen can be displayed to the user more quickly. This shortens a line-drawing latency of the stylus pen, and improves writing immediateness of the stylus pen.

At the moment t2, the tablet computer 100 obtains, from the PC 300, the projection image that includes the handwriting trajectory 830, and displays the projection image at the projection layer. The handwriting trajectory 830 and the handwriting trajectory 820 are identical line trajectories, and the handwriting trajectory 830 covers the handwriting trajectory 820. From the moment t2, displaying of the handwriting trajectory 820 may stop. In some examples, after displaying the handwriting trajectory 820 that is locally drawn by the tablet computer 100 for a period of time, the tablet computer 100 stops display of the handwriting trajectory 820 at a moment t3. For example, the moment t3 is same as the moment t2, or the moment t3 is later than the moment t2.

It may be understood that, in an example, between the moment t, and the moment t2, the user continues to use the stylus pen 200 to draw a line on the tablet computer 100, and the stylus pen 200 moves from the point b to a point c. The tablet computer 100 performs local drawing based on information entered by the stylus pen when the stylus pen moves from the point b to the point c, and displays a handwriting trajectory that is locally generated (a line segment between the point b and the point c in FIG. 10, which is represented by a dashed line to distinguish from the handwriting trajectory 820 and the handwriting trajectory 830).

Figure 11:
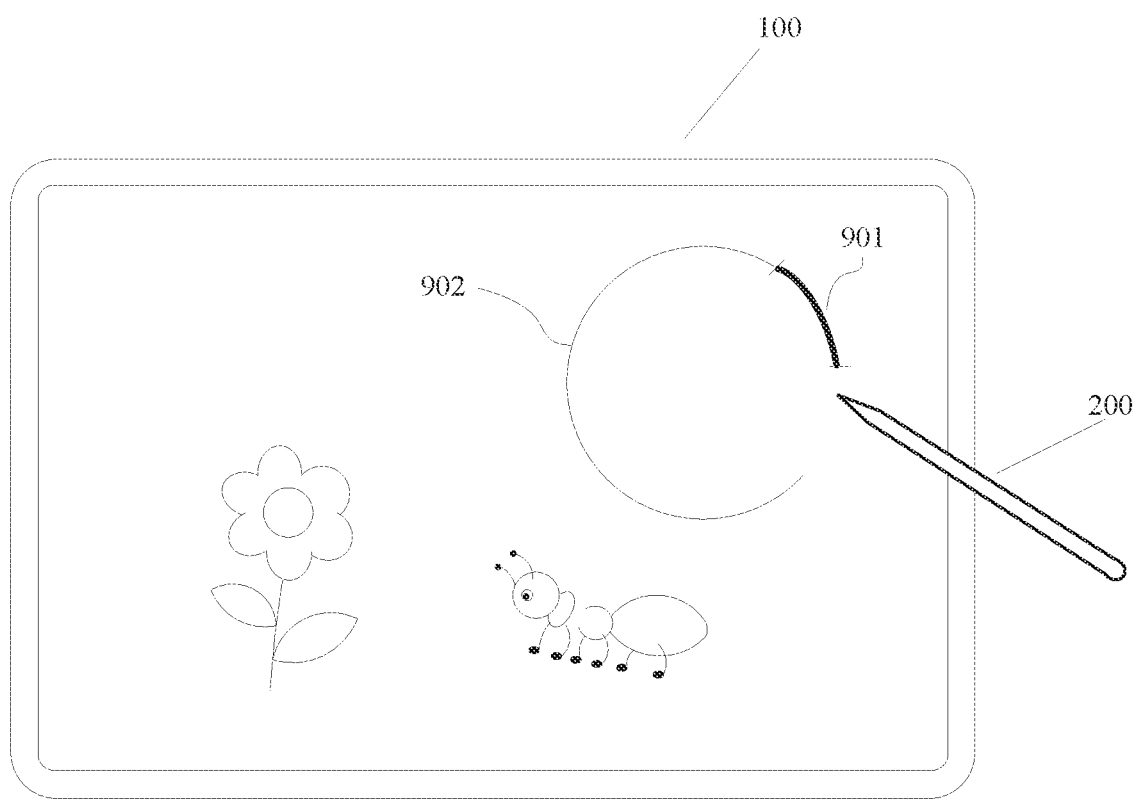
FIG. 11 is an example diagram of a scenario of a stylus pen input method according to an embodiment of this application.

In some embodiments, for a same input of the stylus pen, a handwriting trajectory drawn on the PC is different from a handwriting trajectory drawn on the tablet computer. For example, line colors, line thicknesses, line textures, and line boundaries of the two handwriting trajectories are different. For example, as shown in FIG. 11, the tablet computer 100 locally draws a handwriting trajectory 901, and obtains a handwriting trajectory 902 from the PC 300. A line of the handwriting trajectory 901 that is locally drawn by the tablet computer 100 is thicker than a line of the handwriting trajectory 902 drawn by the PC 300. In this way, the handwriting trajectory that is locally drawn on the tablet computer cannot be well fused with a handwriting trajectory on an image received from the PC.

In the stylus pen input method according to embodiments of this application the PC sends, to the tablet computer a parameter (like a line color parameter, a line thickness parameter, or a line texture parameter) for drawing a handwriting trajectory, and the tablet computer draws a handwriting trajectory based on the parameter for drawing the handwriting trajectory on the PC, so that the handwriting trajectory that is locally drawn by the tablet computer is better fused with a projection image generated by the PC.

In an implementation an application 3 runs on the PC. The application 3 is configured to send, to the tablet computer a parameter for drawing a handwriting trajectory by the PC. In some examples, the application 3 is the same as the application 2 running on the tablet computer. It may be understood that the application 3 may be different from the application 2. This is not limited in embodiments of this application.

Figure 12:
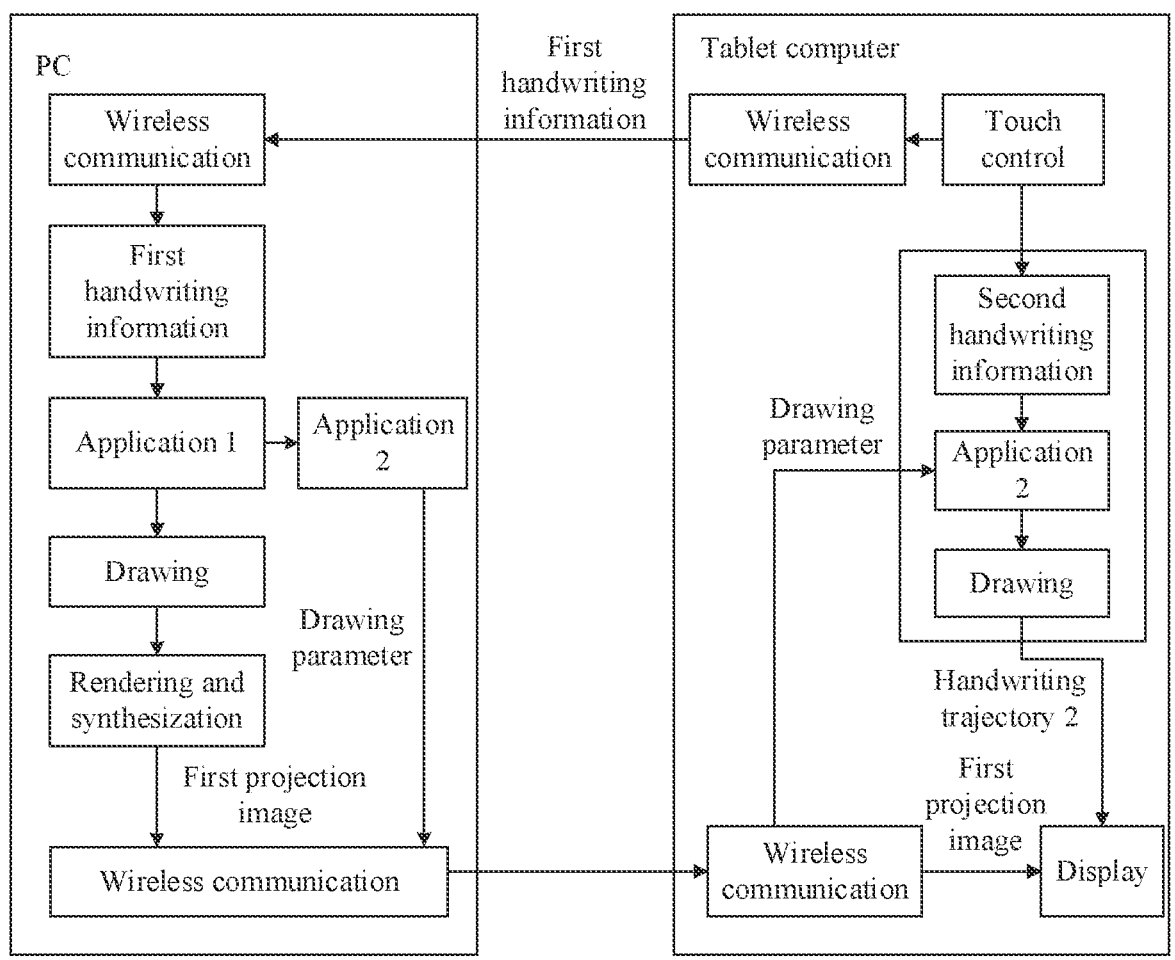
FIG. 12 is a schematic diagram of a stylus pen input method according to an embodiment of this application.

An example in which the application 3 running on the PC is the same as the application 2 running on the tablet computer is used. As shown in FIG. 12, the tablet computer receives the first input of the stylus pen, obtains the first handwriting information, and sends the first handwriting information to the PC. The PC draws the first handwriting trajectory based on the first handwriting information, and performs rendering and synthesis to generate the first projection image that includes the first handwriting trajectory. The PC compresses the first projection image into the video streaming and sends the video streaming to the tablet computer through wireless communication.

The application 1 further sends, to the application 2, a parameter for drawing the first handwriting trajectory by the application 1. In an implementation, each time the application 3 receives a drawing parameter, the application 2 sends the drawing parameter to the tablet computer through wireless communication. In another implementation, if the application 2 receives a drawing parameter for the first time, the application 2 sends the drawing parameter to the tablet computer through wireless communication; and then, each time the application 2 receives a drawing parameter, the application 2 compares the drawing parameter with a drawing parameter that is received last time. If it is determined that any one in the drawing parameter is changed, a changed drawing parameter is sent to the tablet computer through wireless communication.

The tablet computer further receives the second input of the stylus pen, and obtains second handwriting information. The application 2 running on the tablet computer draws the second handwriting trajectory based on the second handwriting information by using the drawing parameter received from the PC. The tablet computer displays the second handwriting trajectory on the first projection image in a superimposed manner. Because the drawing parameter used by the tablet computer to draw the second handwriting trajectory is the same as the drawing parameter used by the PC to draw the first handwriting trajectory the second handwriting trajectory can be well fused with the first projection image that includes the first handwriting trajectory: This brings better visual effect.

In another implementation, a function of the application 3 may also be implemented by the application 1, that is the application 1 sends, to the tablet computer, a parameter used by the PC to draw the handwriting trajectory. This is not limited in embodiments of this application.

In the stylus pen input method according to embodiments of this application, the electronic device generates, by using a computing capability of the processing device, a projection image that includes a handwriting trajectory, locally draws the handwriting trajectory, and displays the handwriting trajectory that is locally drawn onto the projection image generated by the processing device in a superimposed manner. Because a local drawing latency of the electronic device is small, the handwriting trajectory that is locally drawn reduces a distance between the stylus pen on the screen of the electronic device and the handwriting trajectory on the projected image, and reduces a line-drawing latency of an input of the stylus pen on the electronic device, so that writing immediateness of the stylus pen is improved.

It may be understood that, to implement the foregoing functions, the electronic device includes a hardware structure and/or software module to perform each corresponding function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. During actual implementation, another division manner may be used.

Figure 13:
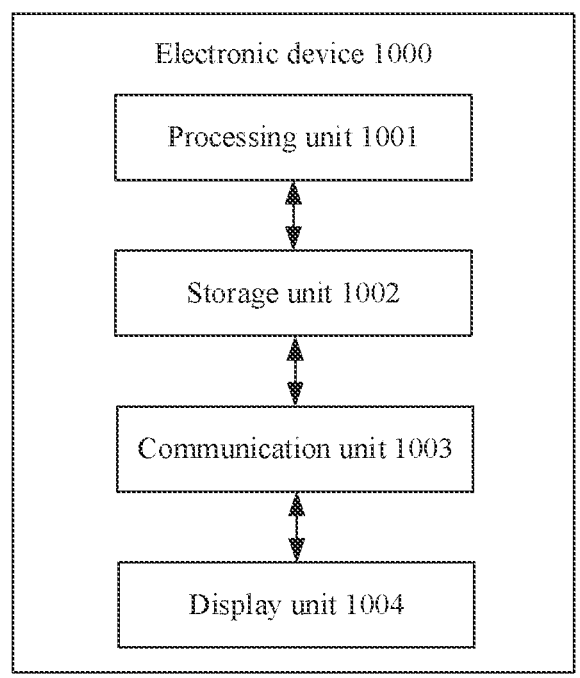
FIG. 13 is a schematic diagram of a structural composition of an electronic device according to an embodiment of this application.

In an example, FIG. 13 is a schematic diagram of a possible structure of the electronic device in the foregoing embodiments. The electronic device 1000 includes a processing unit 1001, a storage unit 1002, a communication unit 1003, and a display unit 1004.

The processing unit 1001 is configured to control and manage an action of the electronic device 1000. For example, the processing unit may be configured to draw a handwriting trajectory based on handwriting information, and/or perform another processing step in an embodiment of this application.

The storage unit 1002 is configured to store program code and data of the electronic device 1000. For example, the storage unit may be configured to store a drawing parameter obtained from a processing device.

The communication unit 1003 is configured to support the electronic device 1000 in communicating with another electronic device. For example, the communication unit may be configured to send the handwriting information to the processing device, receive a projection image that includes the handwriting trajectory from the processing device, and/or receive a drawing parameter from the processing device.

The display unit 1004 is configured to display an interface of the electronic device 1000. For example, the display unit may be configured to display an image that includes the handwriting trajectory.

Certainly, unit modules in the electronic device 1000 include but are not limited to the processing unit 1001, the storage unit 1002, the communication unit 1003, and the display unit 1004. For example, the electronic device 1000 may further include a power supply unit. The power supply unit is configured to supply power to the electronic device 1000.

The processing unit 1001 may be a processor or a controller, for example, may be a central processing unit (central processing unit, CPU), a digital signal processor (digital signal processor. DSP), an application-specific integrated circuit (application-specific integrated circuit. ASIC), a field programmable gate array (field programmable gate array, FPGA) or another programmable logic device, a transistor logic device, a hardware component, or any combination thereof. The storage unit 1002 may be a memory. The communication unit 1003 may be a transceiver, a transceiver circuit, or the like. The display unit 1004 may be a display.

For example, the processing unit 1001 is a processor (the processor 110 shown in FIG. 5), the storage unit 1002 may be a memory (the internal memory 121 shown in FIG. 5), the communication unit 1003 may be referred to as a communication interface, and includes a wireless communication module (the wireless communication module 160 shown in FIG. 5), and the display unit 1004 is a display (the display 150 shown in FIG. 5, where the display 150 may be a touchscreen, and a display panel and a touch panel may be integrated into the touchscreen). The electronic device 1000 provided in embodiments of this application may be the electronic device 100 shown in FIG. 5. The processor, the memory, the communication interface, the touchscreen, and the like may be connected together, for example, connected through a bus.

An embodiment of this application further provides a computer-readable storage medium. The computer-readable storage medium stores computer program code; and when a processor executes the computer program code, an electronic device performs the method in the foregoing embodiments.

An embodiment of this application further provides a computer program product; and when the computer program product runs on a computer, the computer is enabled to perform the method in the foregoing embodiments.

The electronic device 1000, the computer-readable storage medium, and the computer program product provided in embodiments of this application each are configured to perform the corresponding methods provided above. Therefore, for beneficial effects that can be achieved by the electronic device 1000, the computer-readable storage medium, and the computer program product, refer to the beneficial effects in the corresponding methods provided above. Details are not described herein again.

Based on the descriptions of the implementations, a person skilled in the art may clearly understand that for the purpose of convenient and brief descriptions, division into the foregoing functional modules is merely used as an example for description. During actual application, the functions may be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between apparatuses or units may be implemented in electrical, mechanical, or other forms.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for enabling a device (which may be a single-chip microcomputer, a chip or the like) or a processor (processor) to perform all or some of the steps of the methods described in embodiments of this application. The foregoing storage medium includes any medium that can store program code, like a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   receiving, by a first electronic device, a projection interface of a first application running on a second electronic device;
   receiving, by the first electronic device, a first input of a stylus pen of a user in the projection interface, wherein the first input comprises a second input and a third input;
   drawing, by the first electronic device and based on the third input, a second layer comprising a second handwriting trajectory; and
   displaying, by the first electronic device, an updated projection interface,
   wherein the updated projection interface comprises a first layer and the second layer, and
   wherein the first layer comprises a first image that comprises a first handwriting trajectory and that is generated by the second electronic device based on the second input,
   wherein a length of a first input time period of the third input is based on a first latency or a second latency,
   wherein the first latency is from the first electronic device obtaining a second image from the second electronic device, and
   wherein the second latency is from the first electronic device generating the second handwriting trajectory.

2. The method of claim 1, further comprising superimposing the second layer on the first layer.

3. The method of claim 1, further comprising:
   obtaining, by the first electronic device, a second image that comprises a third handwriting trajectory, that is from the second electronic device, and that is based on the third input; and
   displaying, by the first electronic device, the second image on the first layer.

4. The method of claim 3, further comprising covering, by the third handwriting trajectory on the first layer, the second handwriting trajectory on the second layer.

5. The method of claim 4, wherein after the second handwriting trajectory is displayed for a preset duration, the method further comprises stopping displaying the second handwriting trajectory, or wherein after the third handwriting trajectory covers the second handwriting trajectory, the method further comprises stopping displaying the second handwriting trajectory.

6. The method of claim 1, wherein the second handwriting trajectory is a continuation trajectory of the first handwriting trajectory, or wherein the second handwriting trajectory coincides with a part of the first handwriting trajectory and comprises a continuation part of the first handwriting trajectory.

7. The method of claim 1, wherein a second input time period of the second input and the first input time period do not overlap at all or partially overlap.

8. The method of claim 1, further comprising:
   obtaining, by the first electronic device and from the second electronic device, a drawing parameter; and
   drawing, by the first electronic device and by using the drawing parameter, the second handwriting trajectory.

9. The method of claim 8, wherein the drawing parameter is configured to be used by the second electronic device to draw the first handwriting trajectory.

10. The method of claim 9, wherein the drawing parameter comprises at least one of a line color parameter, a line thickness parameter, or a line texture parameter.

11. An apparatus, comprising:
    a memory configured to store instructions; and
    one or more processors coupled to the memory and configured to execute the instructions to:
       receive a projection interface of a first application running on an electronic device;
       receive a first input of a stylus pen of a user in the projection interface, wherein the first input comprises a second input and a third input;
       draw, based on the third input, a second layer comprising a second handwriting trajectory; and
       display an updated projection interface,
       wherein the updated projection interface comprises a first layer and the second layer,
       wherein the first layer comprises a first image that comprises a first handwriting trajectory and that is generated by the second electronic device based on the second input,
       wherein a length of a first input time period of the third input is based on a first latency or a second latency, wherein the first latency is from the first electronic device obtaining a second image from the second electronic device, and wherein the second latency is from the first electronic device generating the second handwriting trajectory.

12. The apparatus of claim 11, wherein the second layer is superimposed on the first layer.

13. The apparatus of claim 11, wherein the one or more processors are further configured to execute the instructions to:

obtain a second image that comprises a third handwriting trajectory, that is from the electronic device, and that is based on the third input; and display the second image on the first layer.

14. The apparatus of claim 13, wherein the one or more processors are further configured to execute the instructions to cover, by the third handwriting trajectory on the first layer, the second handwriting trajectory on the second layer.

15. The apparatus of claim 14, wherein after the second handwriting trajectory is displayed for a preset duration, the one or more processors are further configured to execute the instructions to stop displaying the second handwriting trajectory, or wherein after the third handwriting trajectory covers the second handwriting trajectory, the one or more processors are further configured to execute the instructions to stop displaying the second handwriting trajectory.

16. The apparatus of claim 11, wherein the second handwriting trajectory is a continuation trajectory of the first handwriting trajectory, or wherein the second handwriting trajectory coincides with a part of the first handwriting trajectory and comprises a continuation part of the first handwriting trajectory.

17. The apparatus of claim 11, wherein a second input time period of the second input and the first input time period do not overlap at all or partially overlap.

18. A computer program product comprising instructions stored on a non-transitory computer-readable medium that, when executed by one or more processors, cause an apparatus to:

receive a projection interface of a first application running on an electronic device;

receive a first input of a stylus pen of a user in the projection interface, wherein the first input comprises a second input and a third input;

draw, based on the third input, a second layer comprising a second handwriting trajectory; and display an updated projection interface, wherein the updated projection interface comprises a first layer and the second layer, wherein the first layer comprises a first image that comprises a first handwriting trajectory and that is generated by the second electronic device based on the second input, wherein a length of a first input time period of the third input is based on a first latency or a second latency, wherein the first latency is from the first electronic device obtaining a second image from the second electronic device, and wherein the second latency is from the first electronic device generating the second handwriting trajectory.

19. The computer program product of claim 18, wherein the second handwriting trajectory is a continuation trajectory of the first handwriting trajectory.

20. The computer program product of claim 18, wherein the second handwriting trajectory coincides with a part of the first handwriting trajectory and comprises a continuation part of the first handwriting trajectory.

\* \* \* \* \*